US008626009B2

(12) United States Patent
Imine et al.

(10) Patent No.: US 8,626,009 B2
(45) Date of Patent: Jan. 7, 2014

(54) ELECTRIC POWER CONTROL ON A PLURALITY OF INFORMATION PROCESSING APPARATUSES

(75) Inventors: Ryotaro Imine, Machida (JP); Toshiaki Igarashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 373 days.

(21) Appl. No.: 13/023,376

(22) Filed: Feb. 8, 2011

(65) Prior Publication Data

US 2011/0211851 A1 Sep. 1, 2011

(30) Foreign Application Priority Data

Feb. 26, 2010 (JP) .................................. 2010-043065

(51) Int. Cl.
*G03G 15/00* (2006.01)
(52) U.S. Cl.
USPC ............................................. 399/37; 399/75
(58) Field of Classification Search
USPC ........ 399/37, 75, 88; 358/1.14; 713/300, 310, 713/320
See application file for complete search history.

(56) References Cited

U.S. PATENT DOCUMENTS

| 7,076,673 B2 * | 7/2006 | Yoshikawa ..................... 713/310 |
| 7,787,796 B2 * | 8/2010 | Nosaki ............................. 399/88 |
| 8,228,524 B2 * | 7/2012 | Sugishita ...................... 358/1.14 |
| 2003/0158631 A1 | 8/2003 | Masuda et al. |

FOREIGN PATENT DOCUMENTS

| JP | 2001-327076 A | 11/2001 |
| JP | 2003-32397 A | 1/2003 |

OTHER PUBLICATIONS

U.S. Appl. No. 13/027,026, filed Feb. 14, 2011. Applicant: Ryotaro Imine.
Japanese Office Action dated Aug. 30, 2013 issued in corresponding Japanese Patent Application No. 2010-043065.

* cited by examiner

*Primary Examiner* — William J Royer
(74) *Attorney, Agent, or Firm* — Fitzpatrick, Cella, Harper & Scinto

(57) ABSTRACT

An electric power control apparatus sets a first period for performing electric power control and an overall target amount of power consumption to be consumed by all of a plurality of information processing apparatuses during the first period, calculates an individual target amount of power consumption to be consumed by each information processing apparatus during a plurality of second periods obtained by segmentalizing the first period, based on the first period and the overall target amount, transmits the corresponding second period and the individual target amount to each information processing apparatus, receives an actual usage value of the amount of power consumption in the corresponding second period transmitted from each information processing apparatus, calculates the individual target amount, based on the actual usage value of the amount and the overall target amount, and retransmits the individual target amount to each information processing apparatus.

12 Claims, 20 Drawing Sheets

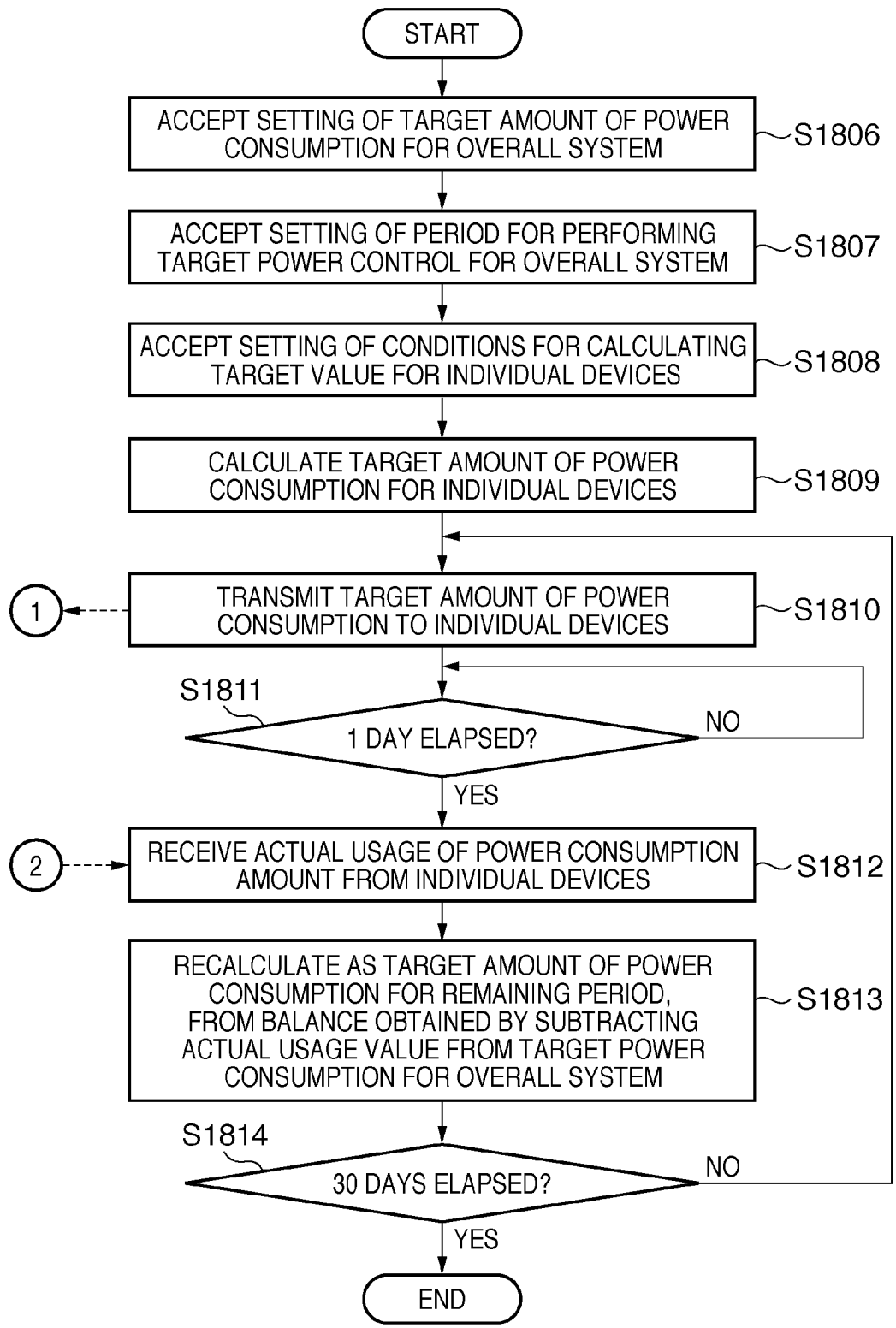

FIG. 12A

PRINTING COLOR SETTINGS SCREEN

MONOCHROME PRINTING SETTINGS UNDER POWER SAVING CONTROL

2401 ☑ APPLY    ☐ DO NOT APPLY

2402 ☐ DEFAULT DESIGNATION

2403 ☑ MANDATORY DESIGNATION

USER INTERFACE BACKLIGHT SETTINGS SCREEN

BACKLIGHT INTENSITY SETTINGS UNDER POWER SAVING CONTROL

DARK — NORMAL ▼ — BRIGHT    2501

2502 ☑ DEFAULT DESIGNATION

2503 ☐ MANDATORY DESIGNATION

OK

F I G. 15
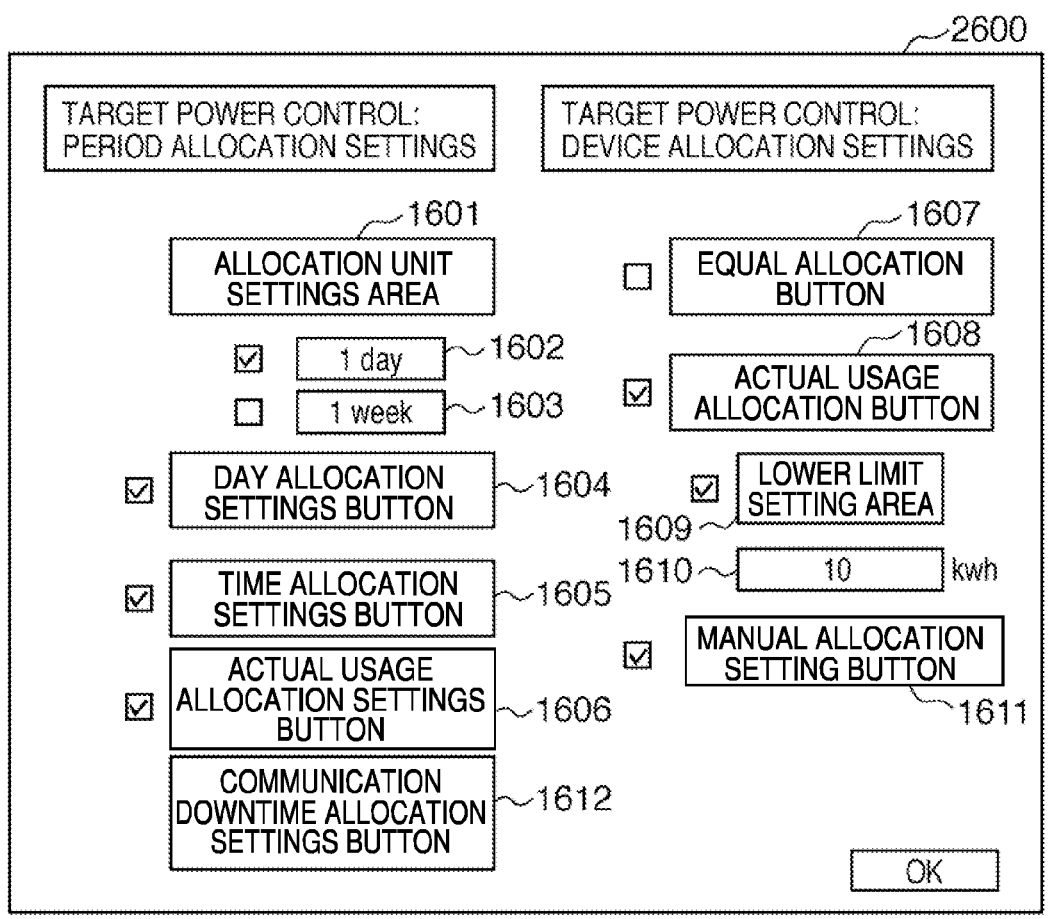

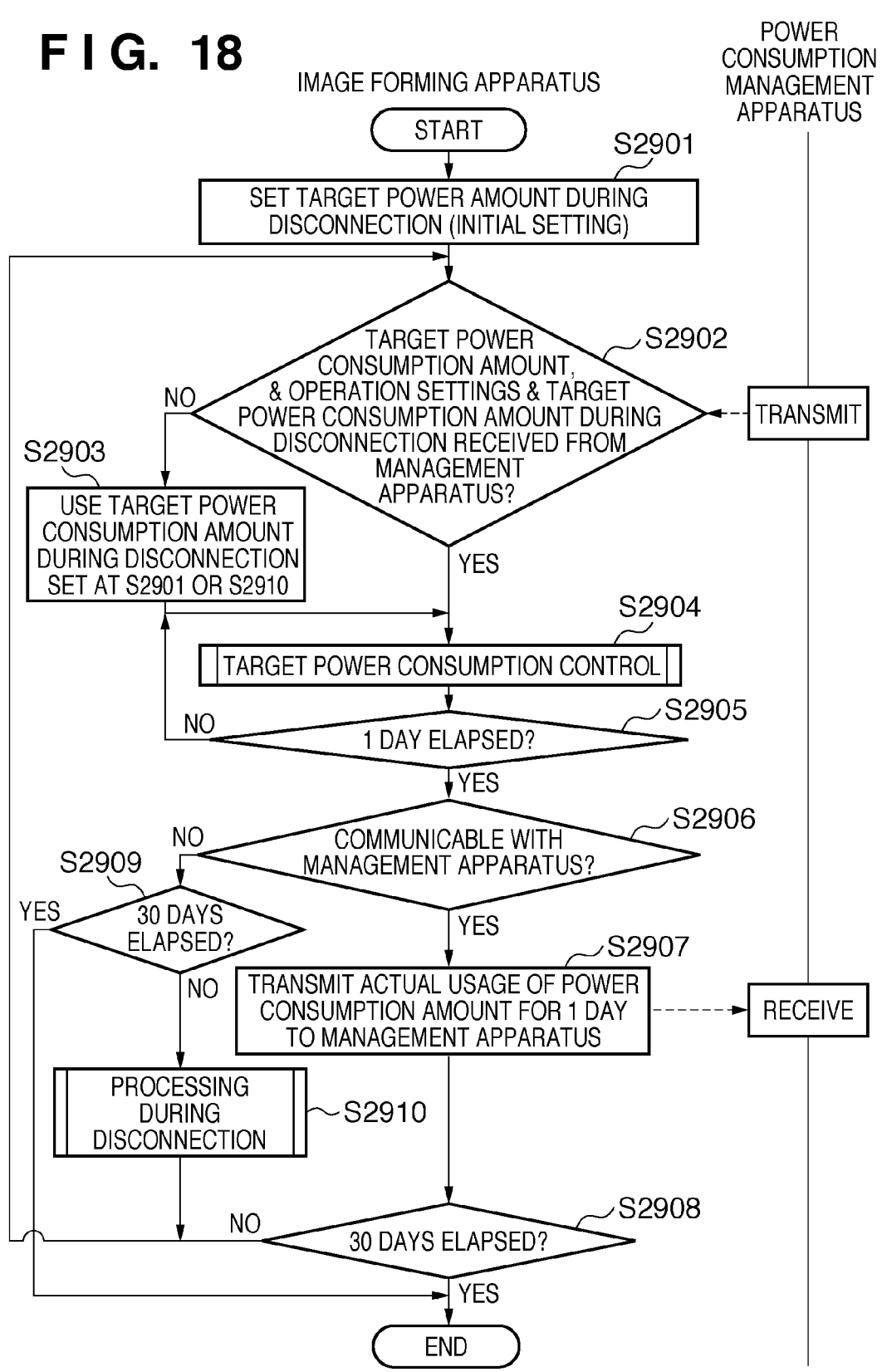

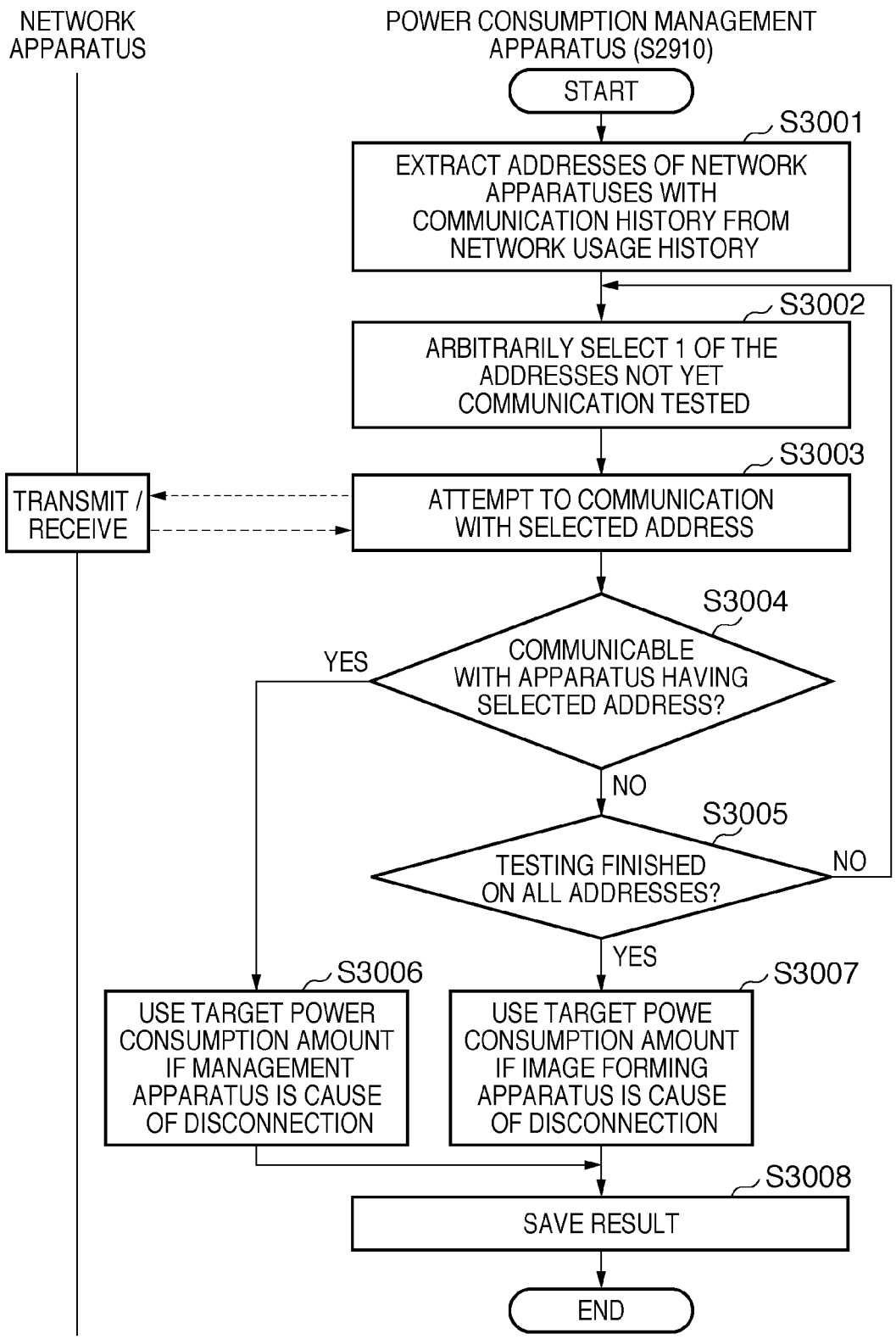

ELECTRIC POWER CONTROL ON A PLURALITY OF INFORMATION PROCESSING APPARATUSES

BACKGROUND OF THE INVENTION

1. Field of the Invention

The present invention relates to an electric power control apparatus and an electric power control system for controlling the amount of power consumed by a plurality of information processing apparatuses.

2. Description of the Related Art

Known conventional electric power control techniques for saving power include target power control that involves establishing a criterion for targeting a power source with respect to power consumed by an apparatus that is driven, and performing electric power control based on that criterion. For example, an amount of power consumption serving as a fixed target is set as a power consumption criterion for an image forming apparatus. Based on this criterion, the image forming apparatus saves power by entering a power saving mode such as a sleep mode in which little power is consumed.

Also, Japanese Patent Laid-Open No. 2003-32397 proposes an invention for efficiently controlling overall power consumption in a system in which a plurality of image forming apparatuses are connected by a network. This invention involves controlling the state of each image forming apparatus in power saving mode, such that waiting time for an image forming apparatus that a user wants to use is minimized. Specifically, it is judged whether the total power of all other image forming apparatuses apart from an image forming apparatus that is judged to have the highest priority level exceeds a target value. If the target value has been exceeded, the other image forming apparatuses are set to a power economizing state. In other words, user-friendliness is improved by setting the image forming apparatus judged to have the highest priority level exceptionally to always be in an operational state.

In other words, while the image forming apparatus that is preferentially always in an operational state can be used at any time, the total amount of power consumption in the overall system is managed with an upper limit value. Consequently, all other image forming apparatuses enter a power economizing state when the amount of power consumption reaches the upper limit, giving rise to a feeling of unfairness among users of low priority image forming apparatuses because they can no longer use those apparatuses. Variability exists among image forming apparatuses belonging to an actual office network environment in terms of function, performance, operating time, and operating content. In order to control the amount of power consumed by image forming apparatuses placed in a variable usage environment, target power control thus needs to be performed with consideration for the factors causing that variability.

SUMMARY OF THE INVENTION

The present invention enables realization, in an electric power control apparatus and an electric power control system for controlling power consumption by a plurality of information processing apparatuses, of an electric power control technique for power saving based on actual usage, at the time of using the information processing apparatuses.

One aspect of the present invention provides an electric power control apparatus for performing electric power control on a plurality of information processing apparatuses, comprising: a first setting unit that sets a first period for performing the electric power control, and an overall target amount of power consumption corresponding to an upper limit of an amount of power to be consumed by all of the plurality of information processing apparatuses during the first period; a first calculation unit that calculates an individual target amount of power consumption corresponding to an upper limit of an amount of power to be consumed by each of the plurality of information processing apparatuses during a plurality of second periods obtained by segmentalizing the first period, based on the first period and the overall target amount of power consumption; a transmission unit that transmits the corresponding second period and the individual target amount of power consumption to each of the plurality of information processing apparatuses; a reception unit that receives an actual usage value of the amount of power consumption in the corresponding second period transmitted from each of the plurality of information processing apparatuses in response to the corresponding second period elapsing; and a second calculation unit that calculates the individual target amount of power consumption, based on the actual usage value of the amount of power consumption received from each of the plurality of information processing apparatuses and the overall target amount of power consumption, wherein the transmission unit retransmits the individual target amount of power consumption calculated by the corresponding second calculation unit to each of the plurality of information processing apparatuses, after the actual usage value of the amount of power consumption during the corresponding second period that is transmitted from each of the plurality of information processing apparatuses has been received by the reception unit.

Another aspect of the present invention provides an electric power control system comprising a plurality of information processing apparatuses and an electric power control apparatus for performing electric power control on the plurality of information processing apparatuses, wherein the electric power control apparatus has: a first setting unit that sets a first period for performing the electric power control, and an overall target amount of power consumption corresponding to an upper limit of an amount of power to be consumed by all of the plurality of information processing apparatuses during the first period; a first calculation unit that calculates an individual target amount of power consumption corresponding to an upper limit of an amount of power to be consumed by each of the plurality of information processing apparatuses during a plurality of second periods obtained by segmentalizing the first period, based on the first period and the overall target amount of power consumption; a transmission unit that transmits the corresponding second period and the individual target amount of power consumption to each of the plurality of information processing apparatuses; a reception unit that receives an actual usage value of the amount of power consumption in the corresponding second period transmitted from each of the plurality of information processing apparatuses in response to the corresponding second period elapsing; and a second calculation unit that calculates the individual target amount of power consumption, based on the actual usage value of the amount of power consumption received from each of the plurality of information processing apparatuses and the overall target amount of power consumption, the transmission unit retransmitting the individual target amount of power consumption calculated by the second calculation unit to each of the plurality of information processing apparatuses, after the actual usage value of the amount of power consumption during the corresponding second period that is transmitted from each of the plurality of information processing apparatuses has been received by the reception unit, and the information processing apparatuses each have: a second reception unit that receives the corresponding second period and the individual target amount of power consumption transmitted from the electric power control apparatus; a second transmission unit that transmits an actual usage value of the amount of power consumption in the corresponding second period to the electric power control apparatus, in response to the corresponding second period elapsing; and a power saving control unit that performs a prescribed power saving control, in a case where the actual usage value of the amount of power consumption in the corresponding second period exceeds the individual target amount of power consumption.

Further features of the present invention will become apparent from the following description of exemplary embodiments with reference to the attached drawings.

BRIEF DESCRIPTION OF THE DRAWINGS

FIGS. 8A and 8B are flowcharts showing operations between the power consumption management apparatus and an image forming apparatus.

FIG. 12A shows a screen for printing color settings under power saving control, and FIG. 12B shows a user interface backlight settings screen.

FIG. 15 shows an operation screen for target power control.

FIG. 18 is a flowchart showing operations between an image forming apparatus and the power consumption management apparatus.

FIG. 19 is a flowchart showing processing by an image forming apparatus when communication is down.

DESCRIPTION OF THE EMBODIMENTS

Embodiments of the present invention will now be described in detail with reference to the drawings. It should be noted that the relative arrangement of the components, the numerical expressions and the numerical values set forth in these embodiments do not limit the scope of the present invention unless it is specifically stated otherwise.

Embodiment 1

Figure 1:
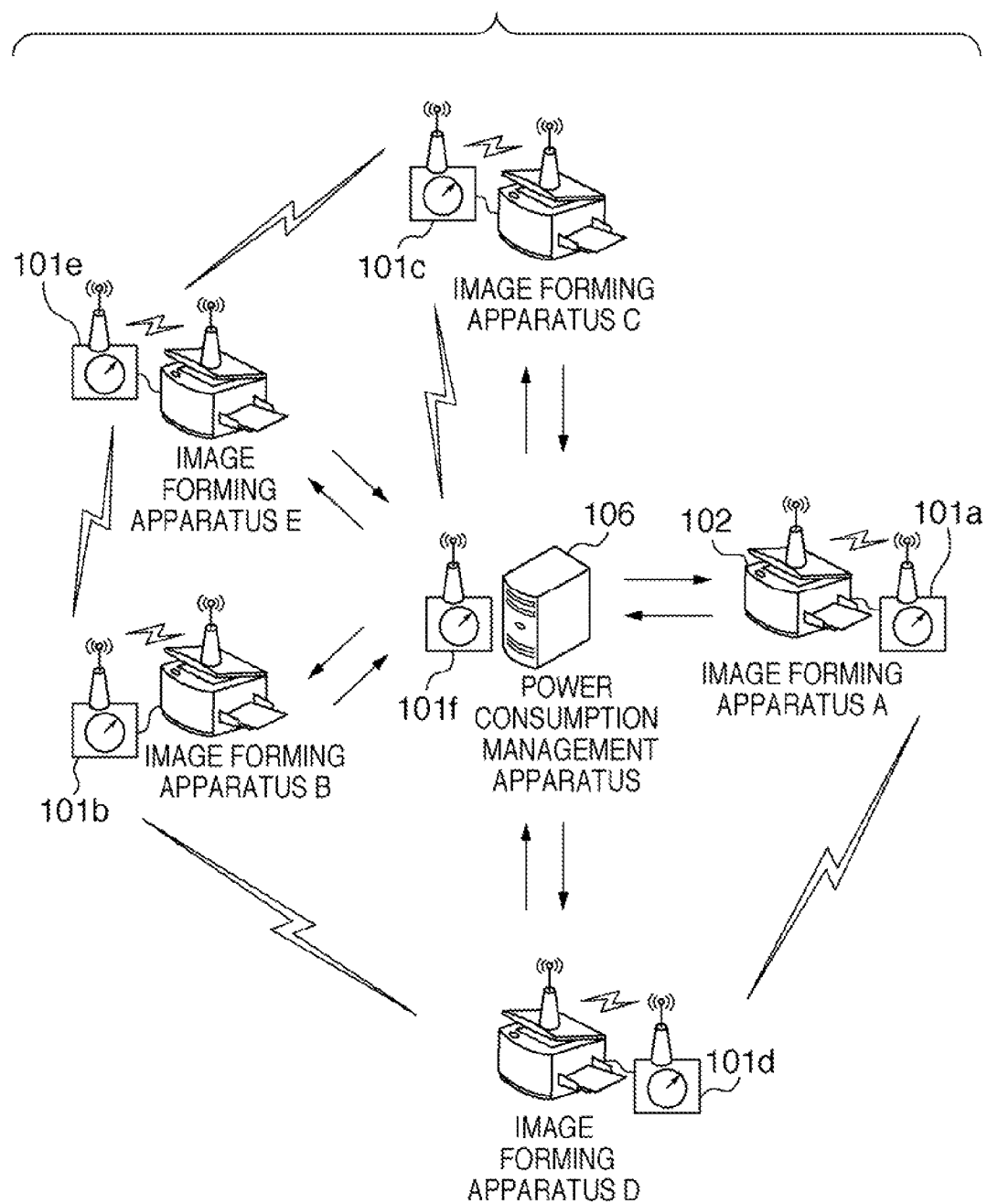
FIG. 1 shows a network configuration of an information processing system.

FIG. 1 shows an example power saving control system of a plurality of information processing apparatuses connected by a network. The power saving control system in the example of the present embodiment is constituted by image forming apparatuses A to E such as printers, copiers, facsimile machines or the like, a power consumption management apparatus 106 that manages the power consumption of each image forming apparatus A to E, and electric power measurement apparatuses (101a to 101f) that measure power consumed by each image forming apparatus A to E.

Also, information transmission means between the devices constituting the power saving control system and connected by the network is illustrated, taking wireless communication means as an example. In this case, the wireless communication means is multi-hop wireless communication. The image forming apparatuses A to E perform mutual transmission of information with the power consumption management apparatus 106 and the electric power measurement apparatuses (101a to 101f), either directly through or relayed via the wireless communication means. Although an example is thus shown in which the information transmission means is wireless, the information transmission means is not limited to being wireless, and may be connected by a wired connection, provided that information transmission can be performed. Also, the electric power measurement apparatus is illustrated as being disposed externally to the image forming apparatus, but the electric power measurement apparatus may be incorporated into the image forming apparatus, provided that power consumption of the image forming apparatus can be measured and the measurement information can be received.

Figure 2:
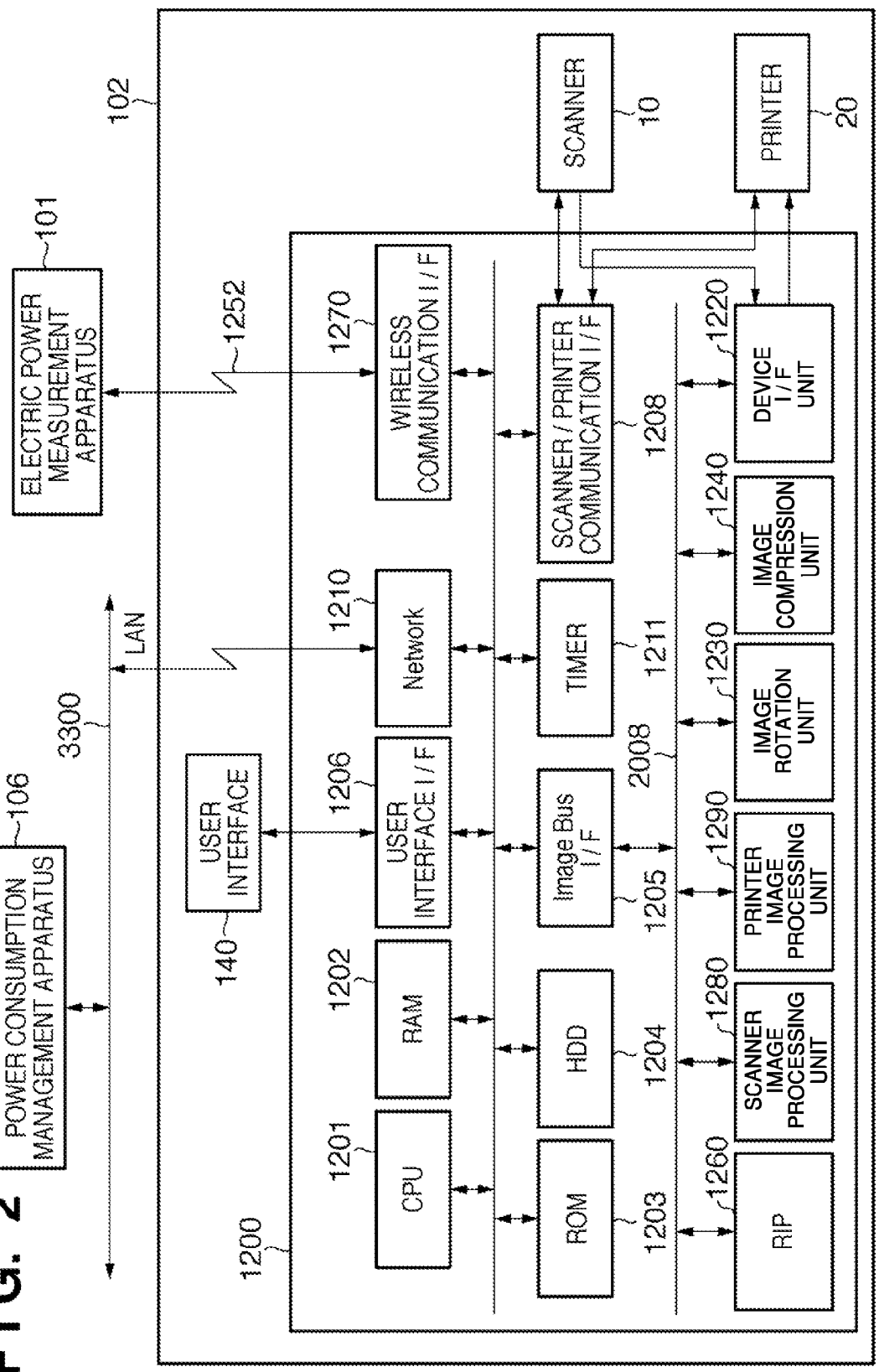
FIG. 2 shows constituent elements of an image forming apparatus.

The image forming apparatuses A to E receive information on power consumption from the electric power measurement apparatuses 101 (FIG. 2). Also, the image forming apparatuses A to E receive power saving control period information and target values for implementing target power control from the power consumption management apparatus 106. The image forming apparatuses A to E implement target power consumption control based on this received information and power saving control settings configured using a user interface.

FIG. 2 shows constituent elements of an image forming apparatus constituting the power saving control system. A controller unit 1200 performs data processing of the image forming apparatus, which plays an active role in power saving control in the power saving control system. The controller unit 1200 is connected to a scanner 10 serving as an image reading device and a printer 20 serving as an image output device. On the other hand, the controller unit 1200 performs input/output of image information, information relating to communication control, and information on the amount of power consumption with a host computer (not shown), an electric power measurement apparatus 101, and an external device (not shown), by being connected to a LAN 3300 and wireless communication 1252.

A CPU 1201 is a controller that controls the overall system. A RAM 1202 is a system work memory for allowing the CPU 1201 to operate, and an image memory for temporarily storing image data. A ROM 1203 is a boot ROM, and stored in the ROM 1203 is a boot program of the system. A HDD 1204 is a hard disk drive, and stored in the HDD 1204 are the system software, image data, a software counter value, a target amount of power consumption, information on the amount of power consumption received from the electric power measurement apparatus 101, and the like. In the software counter value is stored a value that counts the number of image outputs. This counter value is not limited to storage in the HDD 1204, and may be stored in any nonvolatile memory that retains data after power off.

A user interface I/F 1206 is an interface with a user interface (UI) 140, and outputs image data for displaying on the user interface 140 to the user interface 140. Also, the user interface I/F 1206 has a role of conveying information input by a user of the system from the user interface 140 to the CPU 1201. A network 1210 is connected to the LAN 3300, and performs input/output of various data relating to images for output and information relating to device control. Also, the network 1210 is capable of receiving image data for output from a host computer (not shown) on the network or an external device (not shown) that manages image data for output and performing image output, in accordance with input operations using the user interface 140.

A wireless communication I/F 1270 wirelessly connects to peripheral devices such as a digital camera or PC (not shown) or an electric power measurement apparatus 101, and performs input/output of various data relating to images for output and information relating to device control. A scanner/printer communication I/F 1208 is an interface for communicating respectively with the CPU of the scanner 10 and the printer 20. The above devices are placed on a system bus. A timer 1211 functions as a timer that issues time settings for the image forming apparatus and the controller unit, and issues interrupts at fixed intervals.

An image bus I/F 1205 is a bus bridge for converting data structure in response to an instruction of the system bus, and is connected to an image bus 2008 that performs high-speed transfer of image data. The following devices are placed on the image bus 2008. A raster image processor (RIP) 1260 develops PDL code into a bitmap image. A device I/F unit 1220 is connected to the scanner 10 and the printer 20 serving as image input/output devices and a controller, and performs synchronous and asynchronous conversion of image data. A scanner image processing unit 1280 performs correction, modification and editing on input image data. A printer image processing unit 1290 performs printer correction, resolution conversion and the like on image data for printing out. An image rotation unit 1230 performs rotation of image data. An image compression unit 1240 performs JPEG compression and decompression in relation to multi-valued image data, and JBIG, MMR and MH compression and decompression in relation to binary image data.

Also, the image forming apparatuses A to E are provided with a sleep mode for power saving. The CPU 1201 performs control to switch the operation mode to this sleep mode. That is, the CPU 1201 is able to independently control cut-off and supply of power supply to parts such as the printer 20, the scanner 10 and the user interface 140, after having determined the operational state of the image forming apparatus. For example, in the case where only the scanner function is used, power supply to the printer 20 and the printer image processing unit 1290 is cut off. On the other hand, in the case where only the printer function is used, power supply to functional units that are not required such as the user interface 140, the scanner 10 and the scanner image processing unit 1280 is cut off. The image forming apparatuses A to E are thus provided with a mechanism for reducing power consumption.

Figure 3:
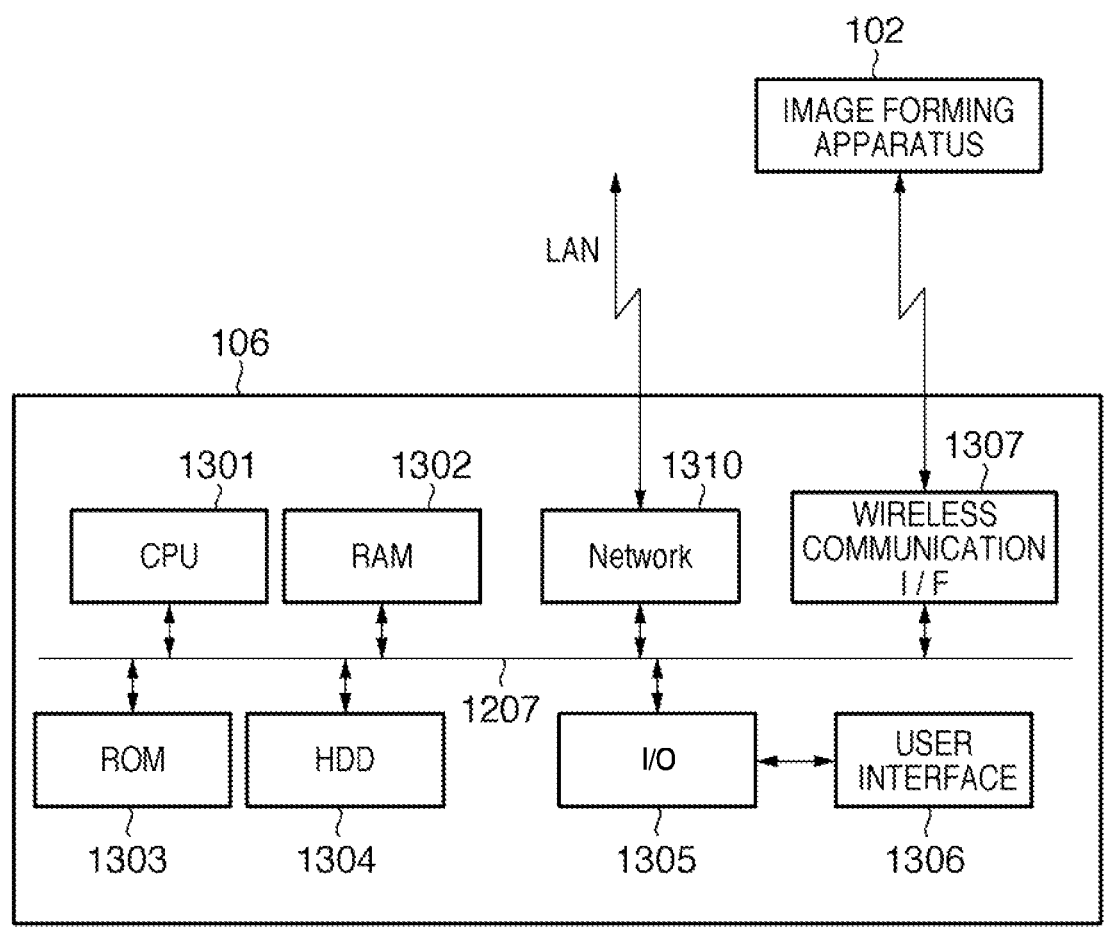
FIG. 3 shows constituent elements of a power consumption management apparatus.

FIG. 3 shows constituent elements of a power consumption management apparatus constituting the power saving control system. The power consumption management apparatus 106 manages the amount of power consumption and the target amount of power consumption in the power saving control system. A CPU 1301 performs overall control of the power consumption management apparatus 106 by executing a control program. A RAM 1302 is a system work memory for allowing the CPU 1301 to operate. A ROM 1303 is a boot ROM, and stored in the ROM 1303 is a system boot program. A HDD 1304 is a hard disk drive, and stored in the HDD 1304 is system software, target amounts of power consumption, amounts of power consumption received from the image forming apparatuses A to E, and the like.

A network 1310 is a LAN connection interface (I/F) for connecting to external devices with a wired LAN. A wireless communication I/F 1307 is a wireless communication interface for performing communication with the image forming apparatuses A to E, and performs reception of information on amounts of power consumption and transmission of target amounts of power consumption. An I/O 1305 is an interface that performs input/output of information with a user interface 1306 constituted by an input/output device (not shown) such as a liquid crystal display or a mouse. Input of various types of setting instructions for setting the target amount of power consumption and the like in the power saving control system can be accepted with this user interface 1306.

The configuration of the power consumption management apparatus 106 has been described above, with this configuration being based on a general-purpose computer. However, the power consumption management apparatus is not limited to this configuration, provided that the amount of power consumption in the power saving control system can be managed and setting input instructions for the target amount of power consumption and the like can be accepted. One of the image forming apparatuses constituting the power saving control system shown in FIG. 2 may act as the above power consumption management apparatus 106.

Figure 4:
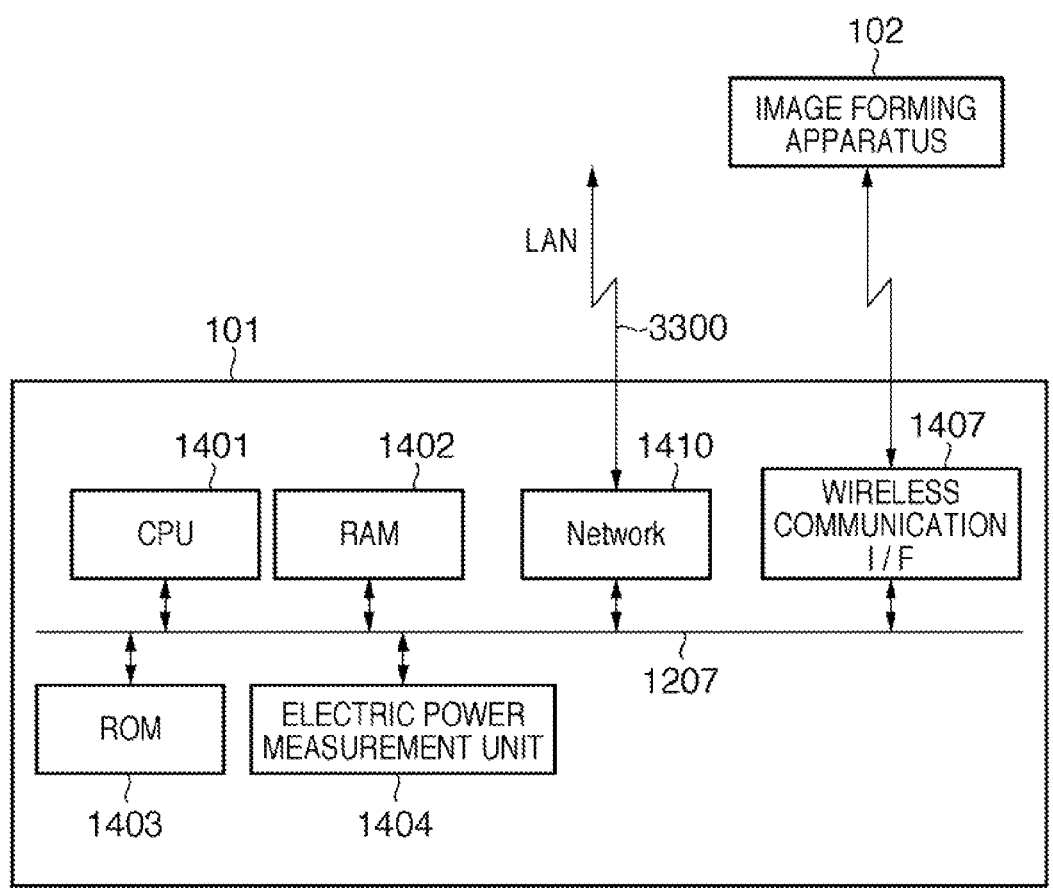
FIG. 4 shows constituent elements of an electric power measurement apparatus.

FIG. 4 shows constituent elements of an electric power measurement apparatus 101 constituting the power saving control system. The electric power measurement apparatus 101 performs measurement of the amount of power consumption and transmission of measurement results in the power saving control system. A CPU 1401 performs overall control of the electric power measurement apparatus 101 such as controlling measurement of power consumption and transmission of measurement results by executing a control program. A RAM 1402 is a system work memory for allowing the CPU 1401 to operate. An image forming apparatus 102 is configured such that the power source is supplied via an electric power measurement unit 1404 of the electric power measurement apparatus 101, and the electric power measurement unit 1404 directly measures the amount of power on a primary side supplied to a power source portion of the image forming apparatus 102. The CPU 1401 stores information such as the amount of power consumption resulting from this measurement in the RAM 1402. A ROM 1403 is a boot ROM, and stored in the ROM 1403 is a boot program of the system and system software.

A network 1410 is a LAN connection interface (I/F) for connecting to external devices with a wired LAN. A wireless communication I/F 1407 is a wireless communication interface for performing communication with the image forming apparatuses A to E, and performs transmission of information on the amount of power consumption in response to a request from an image forming apparatus. Note that transmission and reception of information with an image forming apparatus is not limited to wireless communication such as illustrated in the diagram, and a LAN connection I/F wired via the network 1410 may be used.

Also, the electric power measurement apparatus was illustrated in FIG. 4 as an external electric power measurement apparatus 101 capable of communicating with an image forming apparatus, in order to realize the function of measuring power consumption in the power saving control system. However, the electric power measurement apparatus is not limited to the example configuration disclosed in FIG. 4, provided that the amount of power consumption of an image forming apparatus can be measured in the power saving control system, and a configuration may be adopted in which the function thereof is provided in the image forming apparatus as a power consumption measurement unit.

Figure 5A:
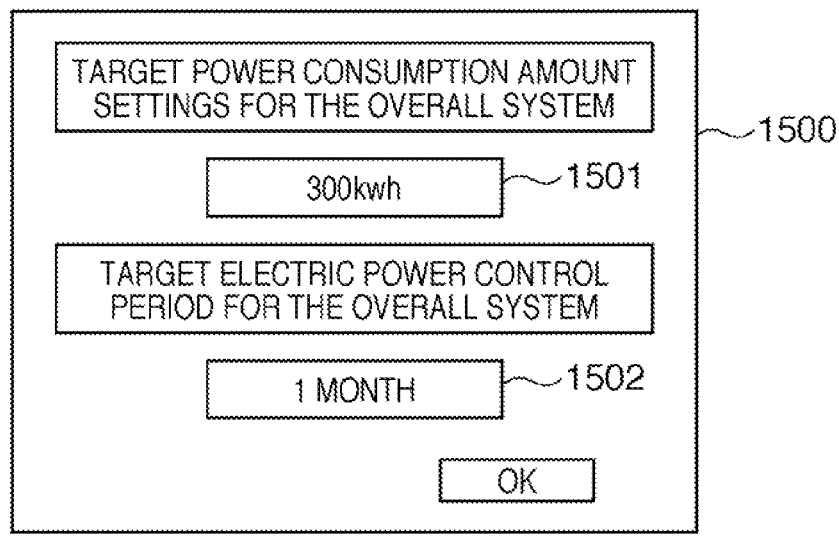
FIG. 5A shows an operation screen for power control of the overall system.

FIG. 5A shows a screen of the user interface 1306 (FIG. 3) of the power consumption management apparatus 106 in the power saving control system of the present invention, with an example of a target power consumption amount settings screen 1500 being shown. The illustrated user interface screen is constituted by an input area 1501 for inputting the overall target amount of power consumption corresponding to an upper limit of the amount of power to be consumed by all of the image forming apparatuses constituting the power saving control system, and an input area 1502 for inputting a target power control period for performing power saving control on the overall system. Values input to these input areas are input in order to calculate a target value for the individual devices as power saving control parameters for the overall system.

Figure 5B:
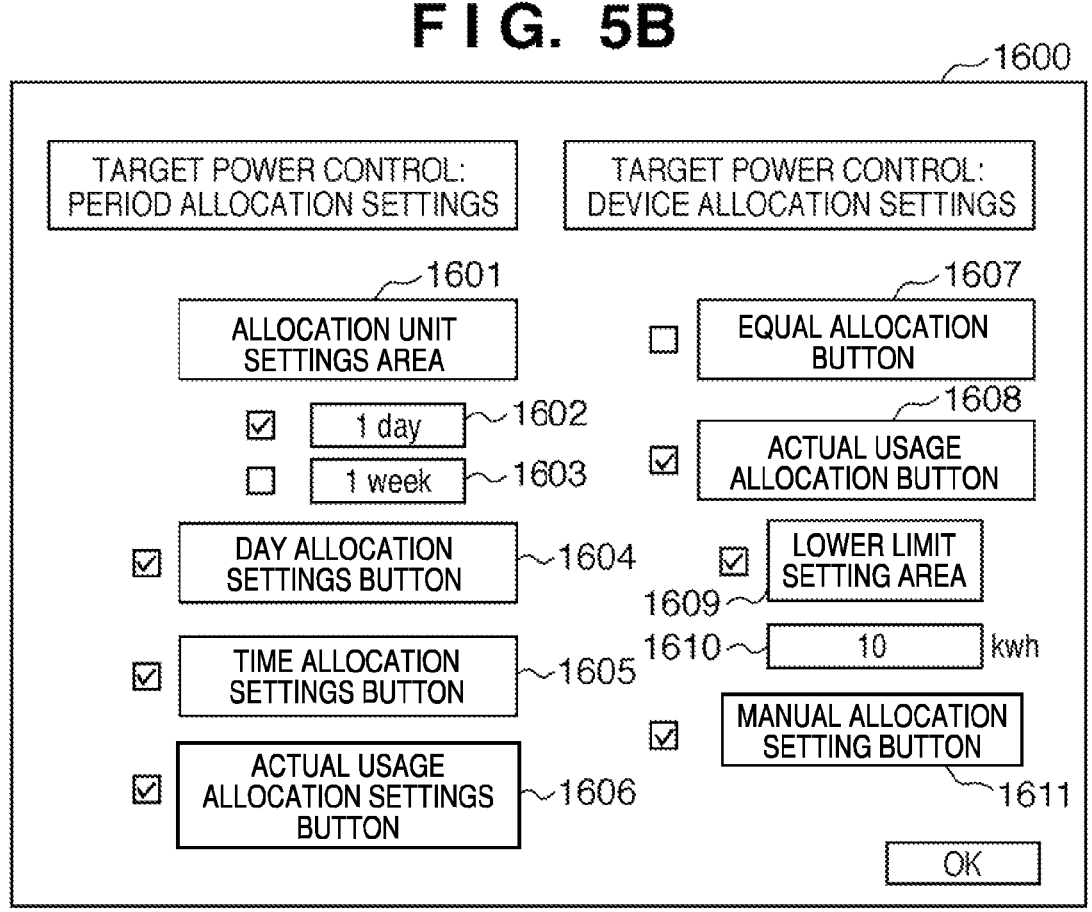
FIG. 5B shows an operation screen for target power control.

FIG. 5B shows a screen of the user interface 1306 (FIG. 3) of the power consumption management apparatus 106 in the power saving control system. Shown here is a screen for configuring advanced settings, in order to calculate a target value for the amount of power consumption to be set for the individual image forming apparatuses. The advanced settings screen 1600 is provided with an allocation unit setting area 1601 for setting the unit of allocation of the period allocation settings. This allocation unit setting area 1601 is provided with selection items that enable the units of allocation for allocating the target amount of power consumption to the target power control period shown in FIG. 5A to be selected using checkboxes in units of 1 day 1602 or 1 week 1603.

Also, the allocation unit setting area 1601 is provided with a day allocation settings button 1604 for setting allocation of the target amount of power consumption by day, and a checkbox for enabling the day allocation setting, in order to configure advanced allocation settings based on the allocation units set in the allocation unit setting area 1601. Pressing this button results in display transiting to a day allocation setting screen 1700 shown in FIG. 6A. The allocation unit setting area 1601 is further provided with a time allocation settings button 1605 for setting allocation of the target amount of power consumption by time, and a checkbox for enabling the time allocation setting. Pressing this button results in display transiting to a time allocation setting screen 1705 shown in FIG. 6B.

Next, the advanced settings screen 1600 is provided with an actual usage allocation settings button 1606 for setting allocation of the target amount of power consumption by actual usage for performing periodical allocation setting according to past actual usage of the amount of power consumption, that is, the actual usage value of the amount of power consumption, and a checkbox for enabling the actual usage allocation setting. This enables the allocation setting to be determined from the amounts of power consumption received from the image forming apparatuses and stored by the power consumption management apparatus 106. The advanced settings screen 1600 is also provided with an equal allocation button 1607 for setting allocation of the target amount of power consumption equally among the image forming apparatuses, and a checkbox for enabling equal allocation, as selection items for performing allocation setting per image forming apparatus. Also, the advanced settings screen 1600 is provided with an actual usage allocation button 1608 for setting allocation proportionally among the image forming apparatuses according to actual usage, and a checkbox for enabling the actual usage allocation setting.

Figure 7A:
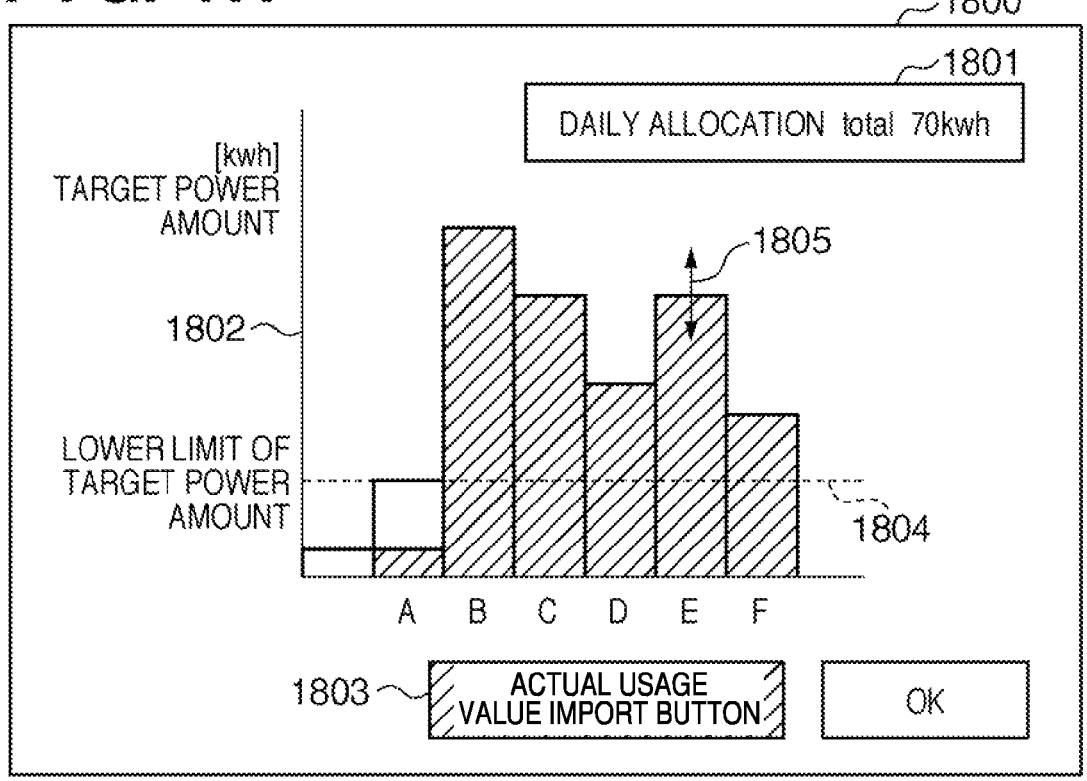
FIG. 7A shows an actual usage allocation settings screen for individual devices.

Pressing the actual usage allocation button 1608 results in display transiting to an actual usage allocation setting screen 1800 shown in FIG. 7A. Because it is envisaged that in the case where this actual usage allocation is selected, an image forming apparatus whose operating rate is extremely low will have an allocation indefinitely approaching zero, a lower limit setting area 1609 is provided so as to enable a minimum usable allocation value to be allocated. Selecting this checkbox enables allocation setting of an amount equal to a value input to a lower limit setting value input area 1610 that has been set.

Further, the advanced settings screen 1600 is provided with a manual allocation settings button 1611 for performing allocation of the target amount of power consumption among the devices manually, and a checkbox for enabling the manual allocation setting. Pressing the manual allocation settings button 1611 results in display transiting to a manual settings screen 1806 shown in FIG. 7B.

Figure 6A:
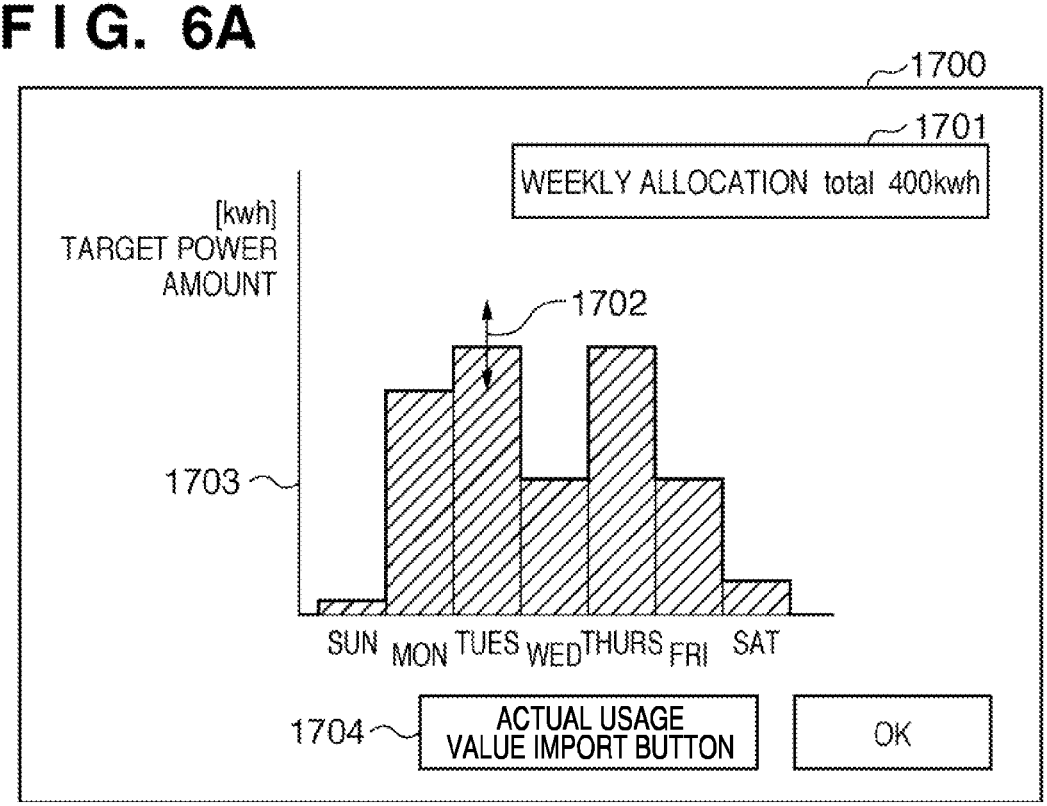
FIG. 6A shows a day allocation settings screen for individual devices.

FIG. 6A shows the day allocation settings screen 1700 displayed with the day allocation settings button 1604 on the advanced settings screen 1600 of FIG. 5B. The day allocation settings screen 1700 is provided with a total allocation value 1701 allocated for the week, a display area 1703 for displaying the daily target amounts of power consumption shown with a bar graph, and an actual usage value import button 1704 for importing the actual usage values for one week and displaying the imported actual usage values as a bar graph. The day allocation settings screen 1700 also further includes a change arrow 1702 for changing the daily values. Because the change of values using this change arrow 1702 is limited to a change within the range of the total allocation value 1701, adjustment up or down between the days of the week is performed within this limit. For example, in the case where it is estimated that an image forming apparatus whose actual usage value has not reached the lower limit of the allocated target amount of power consumption will continue to similarly use a small amount of power, the target amount of power consumption to be reallocated may be reduced, thereby allowing the amount of power by which the target amount of power consumption was reduced to be allocated to another image forming apparatus. In the case where the actual usage values of the power consumption amount of the image forming apparatuses differ, reallocation of the target amount of power consumption for each image forming apparatus based on these actual usage values can be set.

Figure 6B:
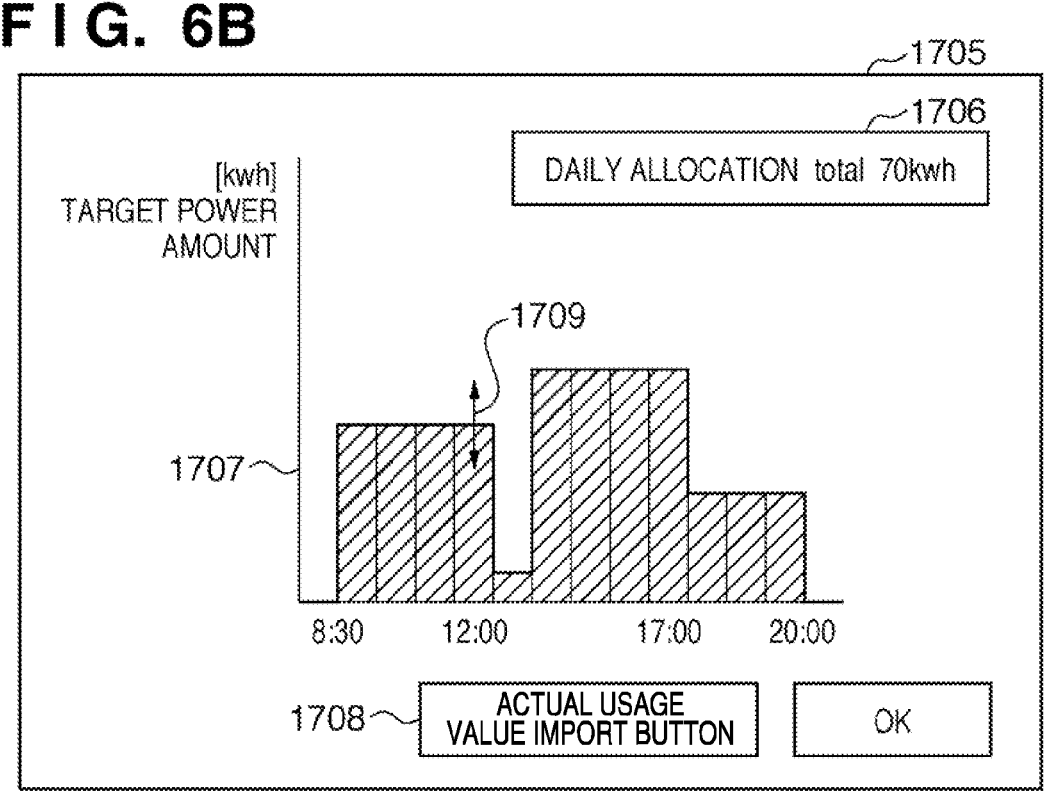
FIG. 6B shows a time allocation settings screen for individual devices.

FIG. 6B shows the time allocation settings screen 1705 displayed using the time allocation settings button 1605 on the advanced settings screen 1600 of FIG. 5B. The time allocation settings screen 1705 is provided with a display area 1706 for displaying the total allocation value allocated for one day, a display area 1707 for displaying the hourly target amount of power consumption shown with a bar graph, and an actual usage value import button 1708 for importing the actual usage values for one day and displaying the imported actual usage values as a bar graph. The time allocation settings screen 1705 is constituted by a change arrow 1709 for changing the hourly values. The method of changing values using this change arrow 1709 is similar to the description given for FIG. 6A.

FIG. 7A shows the actual usage allocation settings screen 1800 displayed using the actual usage allocation button 1608 on the advanced settings screen 1600 of FIG. 5B. The actual usage allocation settings screen 1800 is provided with a display area 1801 for displaying the total allocation value allocated for one day, a bar graph area 1802 for the target amount of power consumption for each device for that day shown as a bar graph, and an actual usage value import button 1803 for importing the actual usage values for one day and displaying the imported actual usage values as a bar graph. Also, the actual usage allocation settings screen 1800 is provided with a change arrow 1805 for changing the device-specific values. The method of changing values using this change arrow 1805 is similar to the description given for FIG. 6A. In the case of FIG. 7A, a state in which a lower limit setting area 1609 shown in FIG. 5B has been set is depicted. This set lower limit value 1804 is shown with a broken line in the bar graph area 1802. For example, in the case of a device A, the actual usage value (shaded portion) is under the lower limit value 1804. In this case, the value of the lower limit value 1804 is allocated to the target amount of power consumption. In other words, the target amount of power consumption is allocated so as to not fall below the prescribed lower limit value.

Figure 7B:
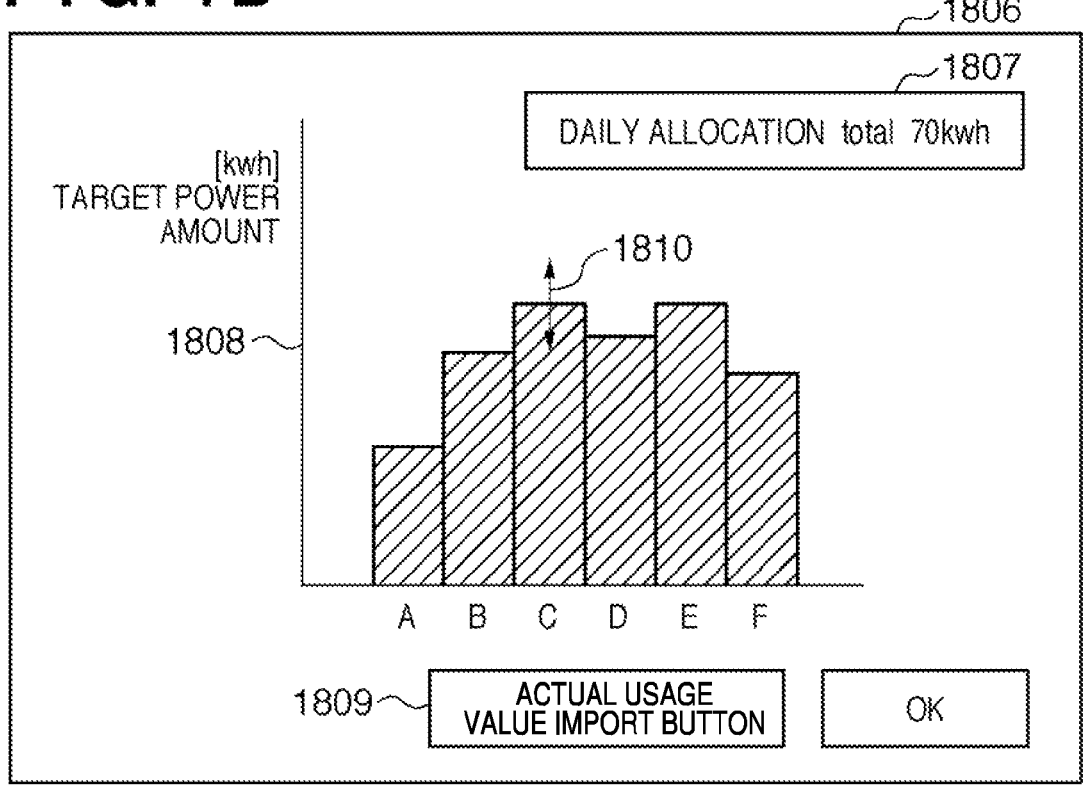
FIG. 7B shows a manual allocation settings screen for individual devices.

FIG. 7B shows the manual allocation settings screen 1806 displayed using the manual allocation settings button 1611 on the advanced settings screen 1600 of FIG. 5B. The manual allocation settings screen 1806 is provided with a display area 1807 for displaying the total allocation value allocated for one day, a bar graph area 1808 for the target amount of power consumption for each image forming apparatus for that day shown with a bar graph, and an actual usage value import button 1809 for importing the actual usage values for one day and displaying the imported actual usage values as a bar graph. Also, the manual allocation settings screen 1806 is provided with a change arrow 1810 for changing the device-specific values. The method of changing values using this change arrow 1810 is similar to the description given for FIG. 6A.

Hereinabove, allocation setting screens were described using FIGS. 6A and 6B and FIGS. 7A and 7B, although the allocation setting screens are not limited to the illustrated example, provided that operation means that enables allocation settings based on the various allocation setting methods to be performed is provided. The various allocation setting screens may be screens that enable confirmation and input of allocation settings using numerical values, for example, instead of with bar graphs and change arrows.

Figure 8A:
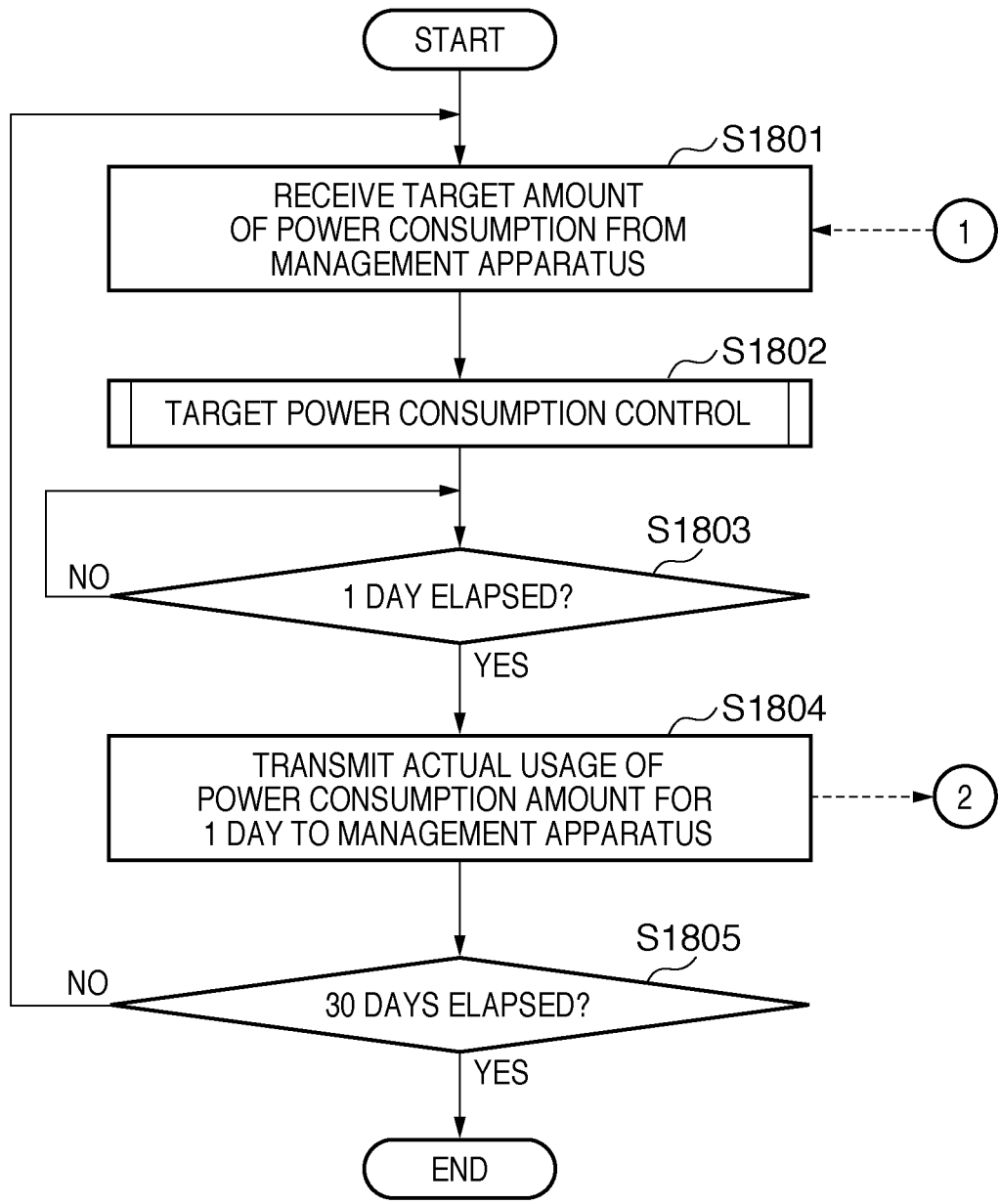

FIGS. 8A and 8B show an example operation flow between the image forming apparatuses A to E and the power consumption management apparatus 106 in the power saving control system of the present embodiment. In particular, coordinated operation involving transmission of information such as the target amount of power consumption and the like between the image forming apparatuses A to E and the power consumption management apparatus 106 will also be described.

At S1806 of the flow of the power consumption management apparatus, the CPU 1301 accepts setting of the target amount of power consumption in the input area 1501 on the target power consumption amount settings screen 1500 displayed on the user interface 1306 in the power consumption management apparatus 106. The CPU 1301 then records the setting value thereof to the RAM 1302 and the HDD 1304. At S1807, the CPU 1301 accepts setting of the target power control period in the input area 1502 (FIG. 5A) on the settings screen 1500 (FIG. 5A), and records the setting value thereof to the RAM 1302 and the HDD 1304. In this case, an example is illustrated in which one month (30 days) is input as the first period. Next, at S1808, the CPU 1301 accepts input of advanced settings for calculating the target amounts of power consumption to be set for the individual image forming apparatuses on the advanced settings screen 1600 (FIG. 5B), and records the input value thereof to the RAM 1302 and the HDD 1304. In this case, the case where the allocation unit setting area 1601 (FIG. 5B) is set to 1 day as the second period is illustrated. In other words, the first period of 30 days is segmentalized into a plurality of second periods in units of 1 day. At S1809, the CPU 1301 decides the individual target amounts of power consumption for the image forming apparatuses corresponding to the upper limit of the amount of power to be consumed by each apparatus in the corresponding second period, from the input allocation setting for the individual image forming apparatuses. Next, at S1810, the CPU 1301 transmits information on the individual target amounts of power consumption to the respective image forming apparatuses A to E (FIG. 1) via the wireless communication I/F 1307 (FIG. 3).

At S1801 in the flow of the image forming apparatuses, the CPU 1201 (FIG. 2) receives information on the target amount of power consumption sent from the power consumption management apparatus 106, and records that information to the RAM 1202 and the HDD 1204. Next, at S1802, the CPU 1201 implements target power consumption control based on this received information on the target amount of power consumption. At S1803, the CPU 1201 determines whether 1 day of the corresponding second period has elapsed.

At S1804, the CPU 1201 of the respective image forming apparatuses A to E, having determined that the second period (1 day) has elapsed, transmits an actual usage value of the amount of power consumption received from the electric power measurement apparatus 101 to the power consumption management apparatus after the second period (1 day) has elapsed (performed by an actual usage value transmission unit). At S1805, the CPU 1201 determines whether the first period (30 days) has elapsed from when electric power control was started. In the image forming apparatuses A to E, S1801 to S1805 are repeated for the duration of these 30 days.

Next, in the power consumption management apparatus 106, the CPU 1301, at S1811, waits for the second period, that is, 1 day, based on the period allocation setting on the advanced settings screen 1600 (FIG. 5B). Next, at S1812, the CPU 1301 receives actual usage values of the amount of power consumption from other image forming apparatuses including the image forming apparatuses A to E, and records those actual usage values to the RAM 1302 and the HDD 1304.

Further, at S1813, the CPU 1301 (FIG. 3) derives the actual usage value of the amount of power consumption for the entire network system. That is, the actual usage value of the amount of power consumption for each of the image forming apparatuses A to E is received and the total amount thereof is derived. This total amount is then subtracted from the overall target amount of power consumption that has been set, and the balance of the target power consumption for that period is calculated. The target amount of power consumption for the overall system for the next second period (1 day) is then calculated, based on that calculated amount of power consumption. The target amount of power consumption reallocated to the image forming apparatuses A to E is then individually accepted, with this calculated target amount of power consumption as the upper limit. Next, at S1814, the CPU 1301 determines whether the target power consumption control period has elapsed. If this period has not elapsed, the CPU 1301 returns to S1810, and retransmits the target amount of power to be reallocated for the next second period individually to the image forming apparatuses A to E. If this period has elapsed, the CPU 1301 ends the target power consumption control. Hereinabove, a coordinated operation flow involving information on the target amount of power consumption and the like transmitted between the image forming apparatuses A to E and the power consumption management apparatus 106 was described.

Figure 9:
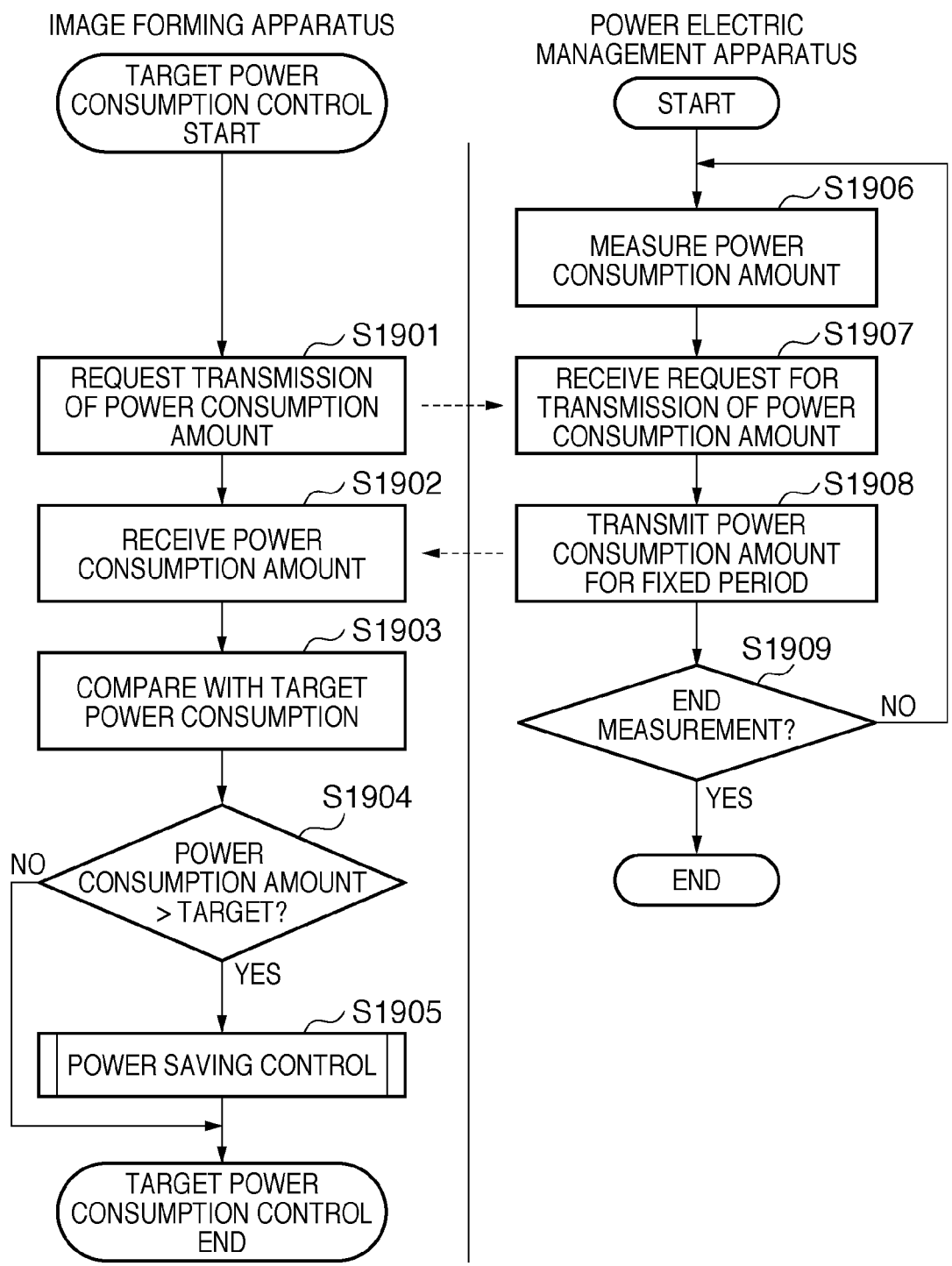
FIG. 9 is a flowchart showing operations between an image forming apparatus and an electric power measurement apparatus.

FIG. 9 shows an example operation flow of the image forming apparatuses A to E and an electric power measurement apparatus 101 in the power saving control system of the present embodiment. In particular, the coordinated operations involving transmission of information on the amount of power consumption and the like between the target power consumption control flow in the image forming apparatuses A to E and an electric power measurement apparatus 101 will be described.

At S1906 of FIG. 9 performed on the electric power measurement apparatus, the electric power measurement apparatus 101 measures the amount of power consumption of the image forming apparatus for a fixed period using the electric power measurement unit 1404. The CPU 1401 (FIG. 4) then stores the measurement value in the RAM 1402 (FIG. 4). Next, the CPU 1401 receives a power consumption amount transmission request from the image forming apparatus. At S1907, the CPU 1401 reads out information on the amount of power consumption recorded in the RAM 1402, and at S1908 transmits that information to the image forming apparatuses A to E. Next, at S1909, the CPU 1401 determines whether to end measurement. If it is determined not to end measurement, S1906 to S1908 are repeated.

At S1901 of the flow of the image forming apparatus in FIG. 9, the CPU 1201 (FIG. 2), in the image forming apparatuses A to E, firstly transmits a request to start power consumption measurement to the electric power measurement apparatus 101, as the target power consumption control in S1802 of FIG. 8A (performed by a request transmission unit). Next, at S1902, the CPU 1201 receives an actual usage value of the amount of power consumption for the image forming apparatus transmitted from the electric power measurement apparatus 101 based on the transmission request.

At S1903, the CPU 1201 compares this power consumption amount with the target value for the power consumption amount set by the power consumption management apparatus 106. The CPU 1201 ends the target power consumption control if the power consumption amount is less than or equal to the target value. At S1905, the CPU 1201 implements power saving control on the image forming apparatuses A to E if the power consumption amount exceeds the target value in S1904.

Figure 10:
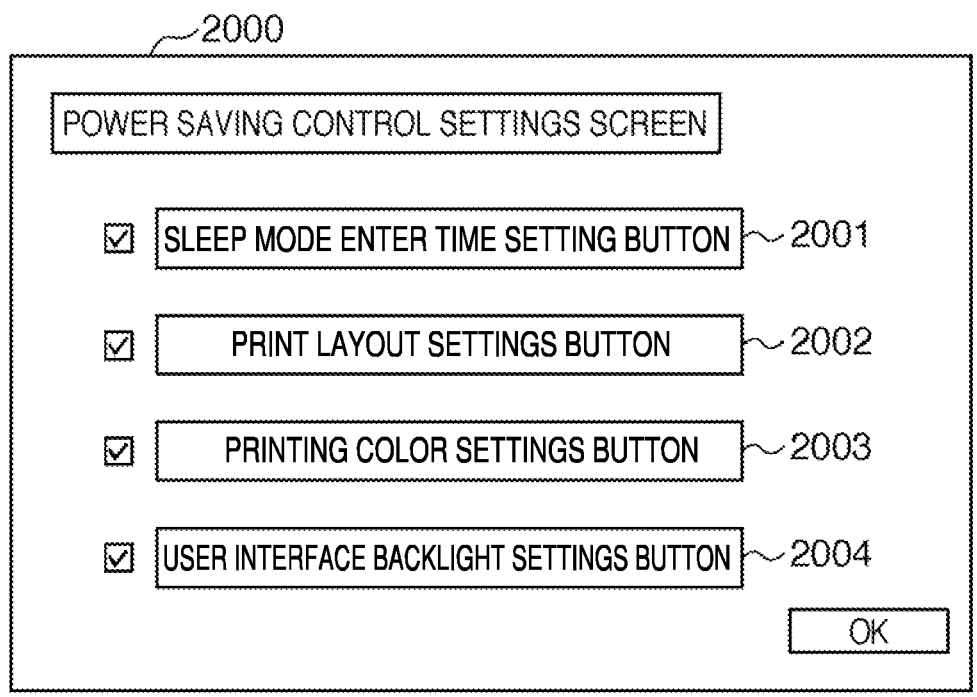
FIG. 10 shows a power saving control settings screen in an image forming apparatus.

FIG. 10 shows an example of a power saving control settings screen 2000 displayed on the user interface 140 (FIG. 2) of the image forming apparatuses A to E of the present embodiment. The power saving control settings screen 2000 is provided with a sleep mode enter time settings button 2001, a print layout settings button 2002, a printing color settings button 2003 and a user interface backlight settings button 2004. Also, the power saving control settings screen 2000 is provided with checkboxes for enabling the respective settings of the above buttons. Checking the checkboxes enables the prescribed power saving controls of the respective settings.

Setting the sleep mode enter time settings button 2001 enables settings relating to the sleep mode enter time to be configured in the case where power saving control is performed. For example, the sleep mode enter time settings button 2001 accepts input of a time setting shortening the sleep mode enter time during normal operation. Setting the print layout settings button 2002 enables settings to be configured such that printing is performed according to reduced layout settings in the case where power saving is performed. For example, print layout settings including 2-in-1, 4-in-1 and duplex printing are selectively accepted.

Also, setting the printing color settings button 2003 enables settings to be configured such that printing is limited to the monochrome settings even with a color print, in the case where power saving control is performed. For example, the printing color settings button 2003 accepts a monochrome setting configured by turning off a color detection function for detecting the color of an original read by the scanner 10 (FIG. 2). Setting the user interface backlight settings button 2004 enables settings to be configured so as to reduce the intensity of the backlight (FIG. 2) of the user interface 140 in the case where power saving control is performed.

The settings of a power saving control settings screen 2000 such as the above are recorded to the RAM 1202 or the HDD 1204 by the CPU 1201 of FIG. 2. Also, the power saving control settings shown in FIG. 10 are merely intended as an example of power saving control for causing the image forming apparatuses A to E in the power saving control system of the present embodiment to perform power saving operations, and the present invention is not limited to the illustrated examples. Any power saving control settings are possible, provided that they are parameter settings or operating mode settings that have a power saving effect on an image forming apparatus.

Figure 11A:
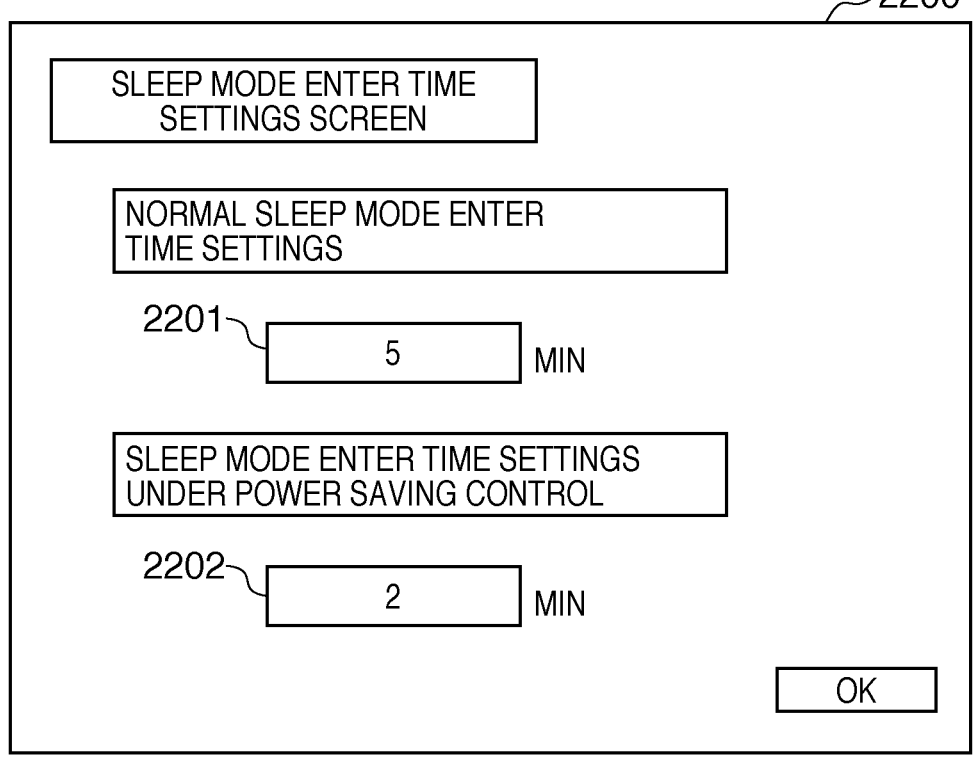
FIG. 11A shows a screen for sleep mode enter time settings under power saving control.

FIG. 11A shows an example sleep mode enter time settings screen 2200 of the power saving control settings screen 2000 in the power saving control system of the present embodiment. The sleep mode enter time settings screen 2200 is constituted by an input area 2201 for sleep mode enter time settings during normal operation, and an input area 2202 for sleep mode enter time settings under power saving control. In the example shown in FIG. 11A, settings are configured so as to enter sleep mode after 5 minutes in normal mode and after 2 minutes under power saving control.

Figure 11B:
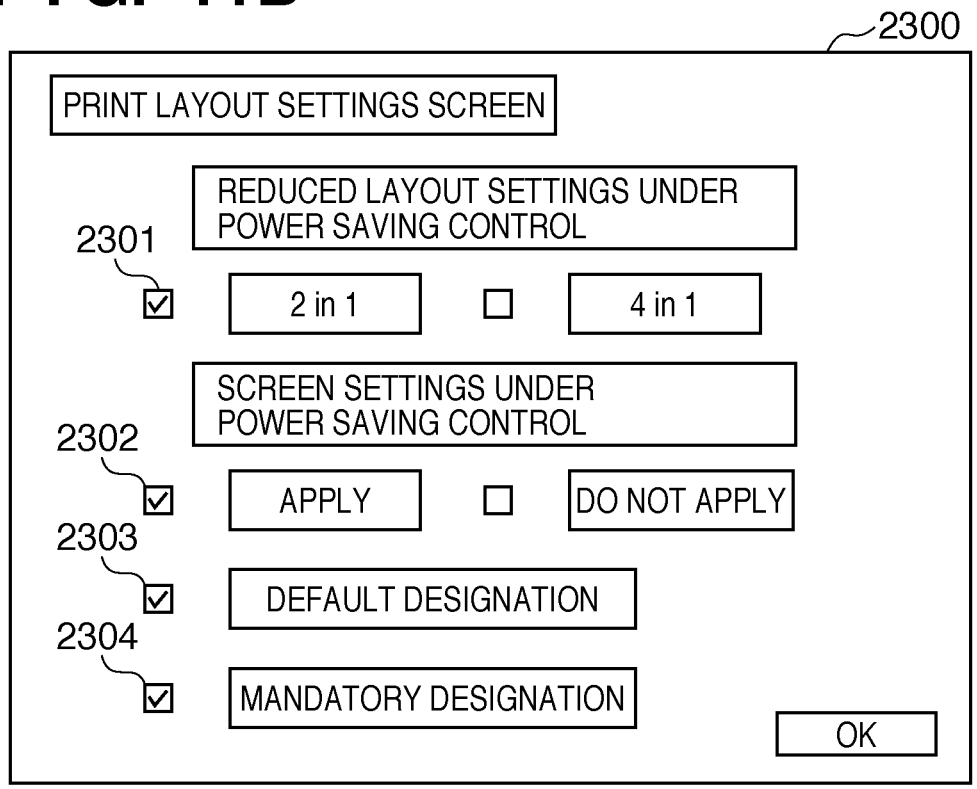
FIG. 11B shows a print layout settings screen.

FIG. 11B shows an example print layout settings screen 2300 of the power saving control settings screen 2000 in the power saving control system of the present embodiment. The print layout settings screen 2300 is constituted by a selection item that enables reduced layout settings configured during power saving control to be selectively configured using a checkbox 2301, and the item of a checkbox 2302 for selecting whether to perform duplex printing under power saving control.

Also, the print layout settings screen 2300 is provided with a selection item 2303 for enabling a user to change the setting result of the above items as default settings, and a selection item 2304 for preventing the user from changing the setting result of the above items as mandatory settings. In the example shown in FIG. 11B, settings are configured such that 2-in-1 is designated in the reduced layout settings, duplex setting is designated, and the user is able to change the settings given the default designation.

FIG. 12A shows an example of a printing color settings screen 2400 of the power saving control settings screen 2000 in the power saving control system of the present embodiment. The printing color settings screen 2400 is provided with a selection item 2401 for setting whether to designate monochrome printing under power saving control, and a selection item 2402 for enabling the user to change this setting result as a default setting. The printing color settings screen 2400 is also provided with a selection item 2403 for preventing the user from changing the setting result of the above item as a mandatory setting. With the example shown in FIG. 12A, monochrome printing under power saving control is designated, and this is set as a mandatorily designation. In this case, the print function is limited to monochrome printing.

FIG. 12B shows an example user interface backlight settings screen 2500 of the power saving control settings screen 2000 in the power saving control system of the embodiment invention. The user interface backlight settings screen 2500 is provided with an adjustment item 2501 for setting the intensity of the backlight under power saving control, and a selection item 2502 for enabling the user to change this setting result as a default setting. The user interface backlight settings screen 2500 is also provided with a selection item 2503 for preventing the user from changing the setting result of the above item as a mandatory setting. With the example shown in FIG. 12B, the backlight intensity is set to be slightly darker than normal, and the user is able to change this setting.

Figure 13:
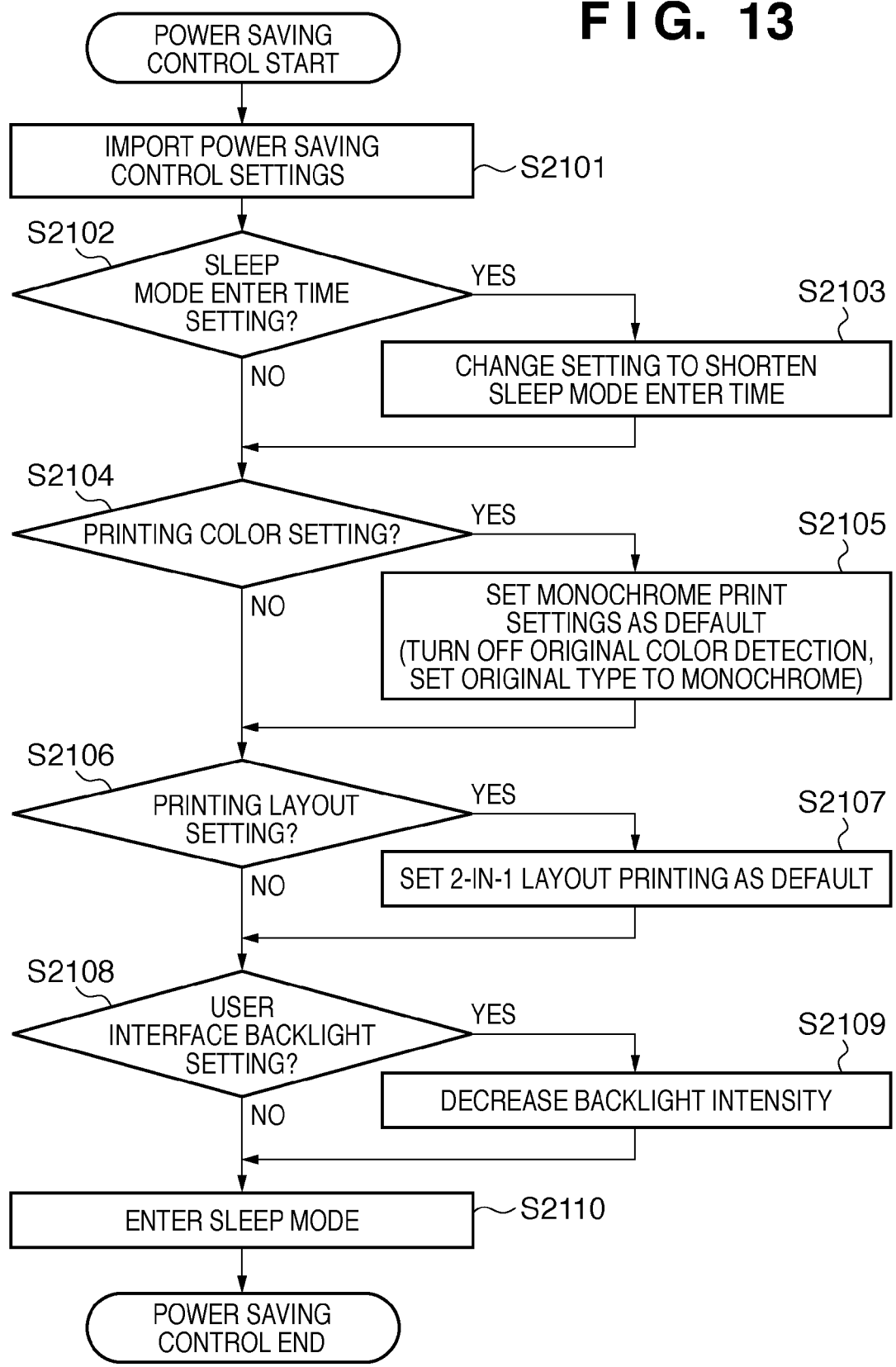
FIG. 13 is a flowchart showing a power saving control operation in an image forming apparatus.

FIG. 13 shows an example power saving control operation flow of the image forming apparatuses A to E in the power saving control system of the present embodiment. At S2101 for power saving control, the CPU 1201 (FIG. 2) reads out the power saving control settings configured in FIG. 9 from the RAM 1202 (FIG. 2) or the HDD 1204 (FIG. 2). Next, at S2102, the CPU 1201 determines whether the sleep mode enter time setting is enabled, based on the read power saving control settings. In the case where the sleep mode enter time setting is enabled, the CPU 1201, at S2103, changes the setting to shorten the sleep mode enter time. In the case where the sleep mode enter time setting has not been enabled, the CPU 1201 moves to S2104.

At S2104, the CPU 1201 determines whether the printing color setting is enabled. If the printing color setting is enabled, the CPU 1201, at S2105, configures the monochrome print settings as the default settings. In this case, the CPU 1201 performs changes to the settings such as turning off original color detection by the scanner and fixing the readout original type to monochrome. If the printing color setting has not been enabled, the CPU 1201 moves to S2106. At S2106, the CPU 1201 determines whether the print layout setting is enabled. If the print layout setting is enabled, the CPU 1201, at S2107, sets 2-in-1 layout printing as the default setting. If the print layout setting has not been enabled, the CPU 1201 moves to S2108.

At S2108, the CPU 1201 determines whether the user interface backlight setting is enabled. If the user interface backlight setting is enabled, the CPU 1201, at S2109, changes the setting to decrease the intensity of the backlight. If the user interface backlight setting has not been enabled, the CPU 1201 moves to S2110. After power saving settings have been configured based on the power saving control settings screen, the CPU 1201, at S2110, causes the image forming apparatuses A to E to enter sleep mode.

Figure 14:
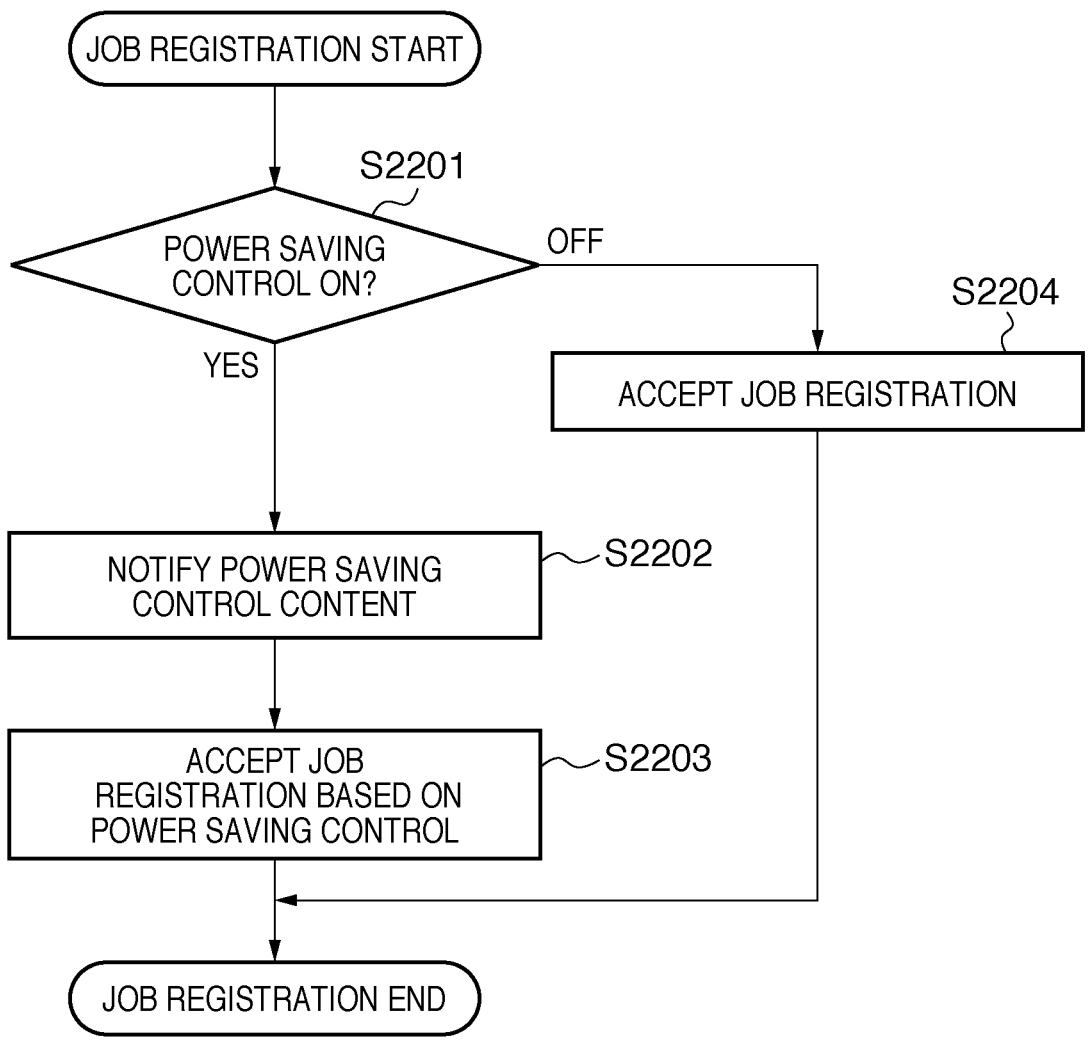
FIG. 14 is a flowchart showing an operation by an image forming apparatus relating to job registration.

FIG. 14 is a flowchart showing an example operation flow relating to job registration by the image forming apparatuses A to E in the power saving control system of the present embodiment. At S2201 for an image forming apparatus, the CPU 1201 (FIG. 2) judges whether power saving control is currently being implemented, in the case of registering a job that includes advanced settings configured by the user interface 140 (FIG. 2). If power saving control is not being implemented (OFF), the CPU 1201, at S2204, unconditionally accepts normal job registration. If power saving control is currently being implemented, the CPU 1201, at S2202, notifies the user that power saving control is currently being implemented by displaying the power saving control content on the user interface 140. Then, at S2203, the CPU 1201 accepts job registration based on the power saving control.

As described above, an image forming apparatus in the power saving control system of the present embodiment determines whether power saving control is currently being implemented at the time of job registration by a user, and accepts job registration in accordance with the determination so that there is no change to the job execution conditions.

Embodiment 2

Next, Embodiment 2 of the present invention will be described. Note that Embodiment 2 is a variation of Embodiment 1. Except for the parts that will in particular be described hereinafter, description will be omitted assuming that the configuration is similar to Embodiment 1.

In Embodiment 1, the image forming apparatuses A to E receive a target value for power consumption from the power consumption management apparatus 106 every second period (1 day), and perform power saving control based on the received target value for power consumption. In Embodiment 2, a configuration is adopted in which the image forming apparatuses A to E are also able to perform power saving control in the case where a target value for power consumption is not received from the power consumption management apparatus 106 every second period (1 day). According to Embodiment 2, the image forming apparatus A is also caused to perform power saving control in the case where, for example, communication between the image forming apparatus A and the power consumption management apparatus 106 is cut.

FIG. 15 shows the advanced settings screen 2600 of the user interface 1306 (FIG. 3) of the power consumption management apparatus 106 in the power saving control system of the present invention. Shown here is a screen for setting advanced conditions, in order to calculate a target value for power consumption set for the individual image forming apparatus. Note that because reference numerals 1601 to 1611 are similar to those shown in FIG. 5B, description thereof will be omitted. An advanced settings screen 2600 of Embodiment 2 is provided with a communication downtime allocation settings button 1612. When the communication downtime allocation settings button 1612 is pressed by an operator, display transits to a communication downtime allocation settings screen 2700 of FIG. 16.

Figure 16:
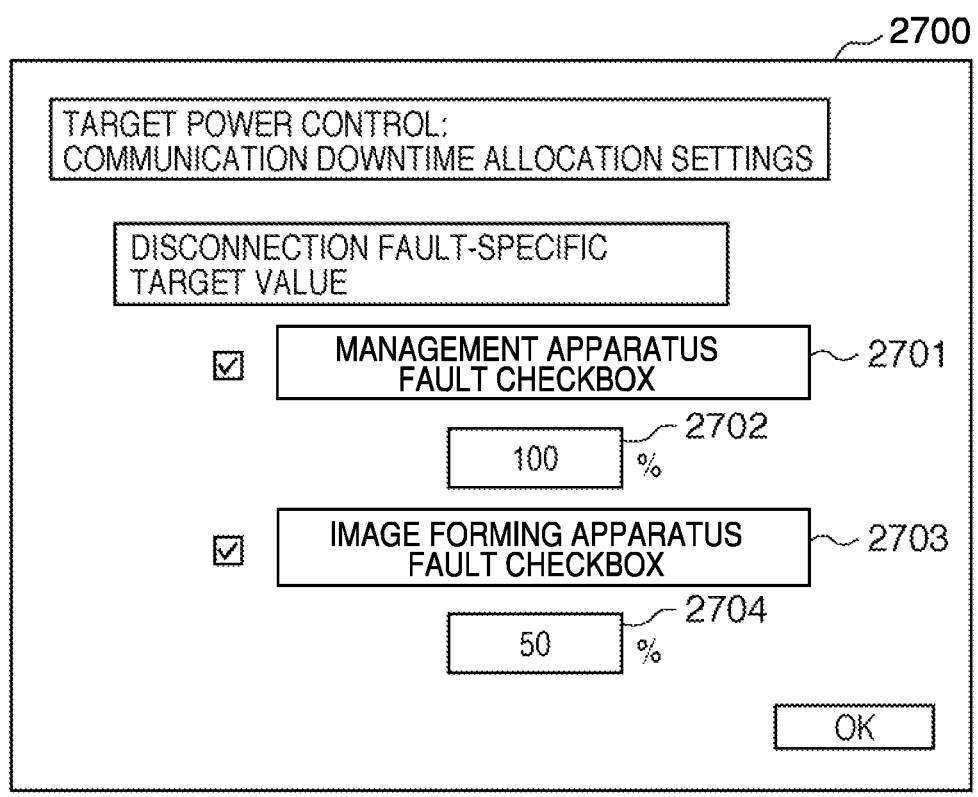
FIG. 16 shows a screen for allocation settings when communication is down.

In FIG. 16 there is a management apparatus fault checkbox 2701. In the case where this checkbox 2701 is checked and the power consumption management apparatus 106 is the cause of the disconnection, the image forming apparatus 102 performs power saving control for the second period (1 day) by multiplying the target amount of power at the time of the disconnection by the numerical value input to a textbox 2702. Note that once the checkbox 2701 is checked, the power consumption management apparatus 106 transmits the numerical value input to the textbox 2702 to the image forming apparatus 102 (A to E).

Also, in FIG. 16 there is an image forming apparatus fault checkbox 2703. In the case where this checkbox 2703 is checked and the image forming apparatus 102 is the cause of the disconnection, the image forming apparatus 102 performs power saving control for the second period (1 day) by multiplying the target amount of power at the time of the disconnection by the numerical value input to a textbox 2704. Note that once the checkbox 2703 is checked, the power consumption management apparatus 106 transmits the numerical value input to the textbox 2704 to the image forming apparatus 102 (A to E).

Figure 17:
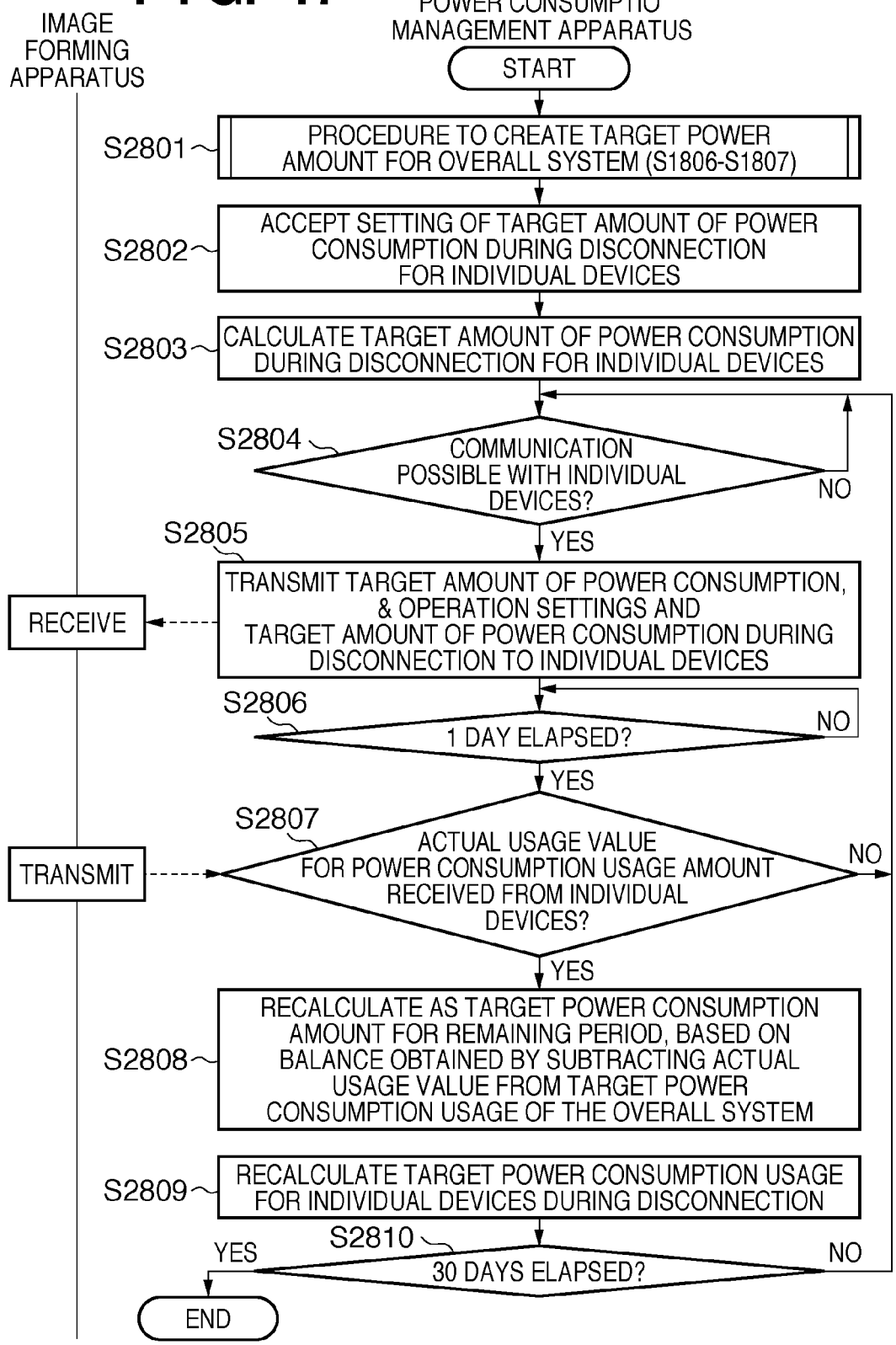
FIG. 17 is a flowchart showing operations between the power consumption management apparatus and an image forming apparatus.

FIG. 17 shows an example operation flow of the image forming apparatuses A to E and the power consumption management apparatus 106 in the power saving control system of the present embodiment. Note that because step S2801 in FIG. 17 is similar to steps S1806 and S1807 in FIG. 8B, description thereof will be omitted. Also, because step S2806, S2808 and S2810 in FIG. 17 are respectively similar to steps S1811, S1813 and S1814 in FIG. 8B, description thereof will be omitted.

At S2802 of FIG. 17, the CPU 1301 accepts setting of the target amount of power by the operator for when communication is disconnected, via the communication downtime allocation settings screen 2700 of FIG. 16. Specifically, the CPU 1301 accepts checking of the management apparatus fault checkbox 2701 and the image forming apparatus fault checkbox 2703. Also, the CPU 1301 accepts input of a numerical value to the textbox 2702 and the textbox 2704. The CPU 1301 then stores the input result in the RAM 1302 or the HDD 1304.

At S2803, the CPU 1301 calculates the target amount of power consumption for when communication is disconnected to be set in the image forming apparatus (A to E), based on the input result in S2802. Specifically, the target amount of power consumption to be set in the image forming apparatus (A to E) when communication is disconnected due to a fault with the management apparatus is calculated by multiplying the target amount of power consumption calculated at S1809 in FIG. 8B by the value in the textbox 2702. Also, the target amount of power consumption to be set in the image forming apparatus when communication is disconnected due to a fault with the image forming apparatus is calculated by multiplying the target amount of power consumption calculated at S1809 in FIG. 8B by the value in the textbox 2704.

At S2804, the CPU 1301 determines whether communication is possible with the image forming apparatus (A to E) via the wireless communication I/F 1307, and, if communication is possible, proceeds to step S2805.

At S2805, the CPU 1301 transmits the target amount of power consumption (management apparatus fault, image forming apparatus fault) calculated at S2803 to the image forming apparatus with which communication is determined to be possible, via the wireless communication I/F 1307. Note that the processing in the image forming apparatus that receives the target amount of power consumption transmitted at S2805 will be described in detail with FIG. 18. At S2807, the CPU 1301 determines whether an actual usage value of the amount of power consumption has been received from the image forming apparatus with which communication was determined to be possible. If it is determined that an actual usage value has been received, the CPU 1301 proceeds to S2808, and if it is determined that an actual usage value has not received, the CPU 1301 proceeds to S2804. If an actual usage value has been received, the CPU 1301 stores the received actual value in the RAM 1302 or the HDD 1304. Also, at S2809, the CPU 1301 recalculates the target amount of power consumption of the image forming apparatus for when communication is disconnected, using the setting received as S2802 and the target amount of power consumption calculated at S2808.

Next, the operation flow of the image forming apparatuses A to E will be described using FIG. 18. FIG. 18 shows an example operation flow of the image forming apparatuses A to E and the power consumption management apparatus 106 in the power saving control system of the present embodiment. At S2901, the CPU 1201 accepts an initial value for the target amount of power consumption to be used in the case where the image forming apparatus 102 cannot communicate with the power consumption management apparatus 106 from the operator of the image forming apparatus 102, and stores the received initial value in the RAM 1202 or the HDD 1204.

At S2902, the CPU 1201 determines whether information on the target amount of power consumption and the target amount of power consumption for when communication is disconnected has been received from the power consumption management apparatus 106, and if the information has been received, stores the received information in the RAM 1202 or the HDD 1204. At S2903, the CPU 1201 sets the target amount of power consumption for when communication is disconnected set at S2901 or at S2910 (described below) as the target amount of power consumption for the image forming apparatus. Also, the CPU 1201 executes S2904 and S2905, although since these steps are similar to S1802 and S1803 in FIG. 9, description thereof will be omitted here.

Next, at S2906, the CPU 1201 determines whether communication is possible with the power consumption management apparatus 106 via the wireless communication I/F 1270. If communication is possible, the CPU 1201 proceeds to at S2907, and if communication is not possible, the CPU 1201 proceeds to at S2909. Here, since S2907 and S2908 are similar to steps S1804 and S1805 in FIG. 9, description thereof will be omitted. At S2909, the CPU 1201 performs a similar determination to step S1805 in FIG. 9, although the present step differs in that if it is determined that 30 days has not elapsed the CPU 1201 proceeds to S2910. At S2910, the CPU 1201 decides the target amount of power consumption to be used when communication is disconnected. Note that the present step will be described in detail with FIG. 19. The CPU 1201 proceeds to S2902 after executing S2910.

Next, the processing flow of the image forming apparatus 102 in the power saving control system of the present embodiment when communication is disconnected will be described using FIG. 19. FIG. 19 illustrates the processing S2910 of FIG. 18 in detail. At S3001, the CPU 1201 extracts the network addresses of network apparatuses (arbitrary apparatuses connected to the network) that have a communication history, from the network usage history of the image forming apparatus stored in the RAM 1202 or the HDD 1204, and temporarily stores the extraction results in the RAM 1202 or the HDD 1204.

At S3002, the CPU 1201 selects one of the arbitrary addresses with respect to which a communication test to be implemented at S3003 has not been implemented, from the extraction results stored at S3001. At S3003, the CPU 1201 attempts to communicate with the communication address selected at S3002, using a Ping command or a Traceroute command. At S3004, the CPU 1201 determines whether the image forming apparatus and the network apparatus can communicate. If it is determined that communication is possible, the CPU 1201 proceeds to S3006, and if it is determined that communication is not possible, the CPU 1201 proceeds to S3005.

At S3005, the CPU 1201 determines whether communication has been attempted with all of the network addresses extracted at S3001. If YES, the CPU 1201 proceeds to S3007, and if NO, the CPU 1201 proceeds to S3002. At S3006, the CPU 1201 extracts the target value for the amount of power consumption in the case where the cause of the communication disconnection lies with the power consumption management apparatus, from the RAM 1202 or the HDD 1204 where this information was stored at S2902 of FIG. 18.

At S3007, the CPU 1201 extracts the target value for the amount of power consumption in the case where the cause of the communication disconnection lies with the image forming apparatus, from the RAM 1202 or the HDD 1204 where this information was stored at S2902 of FIG. 18. Finally, at S3008, the CPU 1201 stores the target value obtained as a result of executing S3006 or S3007 in the RAM 1202 or the HDD 1204 as the target amount of power consumption for when communication is disconnected. Note that the target amount of power consumption for when communication is disconnected stored here is used at S2903 of FIG. 18.

Other Embodiments

Aspects of the present invention can also be realized by a computer of a system or apparatus (or devices such as a CPU or MPU) that reads out and executes a program recorded on a memory apparatus to perform the functions of the above-described embodiment(s), and by a method, the steps of which are performed by a computer of a system or apparatus by, for example, reading out and executing a program recorded on a memory apparatus to perform the functions of the above-described embodiment(s). For this purpose, the program is provided to the computer for example via a network or from a recording medium of various types serving as the memory apparatus (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-043065, filed Feb. 26, 2010, which is hereby incorporated by reference herein in its entirety.

What is claimed is:

1. An electric power control apparatus for performing electric power control on a plurality of information processing apparatuses, comprising:
   a first setting unit that sets a first period for performing the electric power control, and an overall target amount of power consumption corresponding to an upper limit of an amount of power to be consumed by all of the plurality of information processing apparatuses during the first period;
   a first calculation unit that calculates an individual target amount of power consumption corresponding to an upper limit of an amount of power to be consumed by each of the plurality of information processing apparatuses during a plurality of second periods obtained by segmentalizing the first period, based on the first period and the overall target amount of power consumption;
   a transmission unit that transmits the corresponding second period and the individual target amount of power consumption to each of the plurality of information processing apparatuses;
   a reception unit that receives an actual usage value of the amount of power consumption in the corresponding second period transmitted from each of the plurality of information processing apparatuses in response to the corresponding second period elapsing; and
   a second calculation unit that calculates the individual target amount of power consumption, based on the actual usage value of the amount of power consumption received from each of the plurality of information processing apparatuses and the overall target amount of power consumption,
   wherein the transmission unit retransmits the individual target amount of power consumption calculated by the corresponding second calculation unit to each of the plurality of information processing apparatuses, after the actual usage value of the amount of power consumption during the corresponding second period that is transmitted from each of the plurality of information processing apparatuses has been received by the reception unit.

2. The electric power control apparatus according to claim 1,
   wherein the second calculation unit calculates the individual target amount of power consumption, so as to increase the individual target amount of power consumption for an information processing apparatus whose actual usage value of the amount of power consumption is high.

3. The electric power control apparatus according to claim 2,
   wherein the second calculation unit calculates the individual target amount of power consumption, so that the individual target amount of power consumption calculated for each of the plurality of information processing apparatuses does not fall below a prescribed lower limit value.

4. The electric power control apparatus according to claim 1,
   wherein the second calculation unit calculates the individual target amount of power consumption, based on an amount of power obtained by subtracting a total amount of the actual usage values of the amount of power consumption received from the plurality of information processing apparatuses from the overall target amount of power consumption.

5. The electric power control apparatus according to claim 1, comprising a display unit that displays the individual target amount of power consumption calculated by the second calculation unit.

6. An electric power control system comprising a plurality of information processing apparatuses and an electric power control apparatus for performing electric power control on the plurality of information processing apparatuses,
   wherein the electric power control apparatus has:
   a first setting unit that sets a first period for performing the electric power control, and an overall target amount of power consumption corresponding to an upper limit of an amount of power to be consumed by all of the plurality of information processing apparatuses during the first period;
   a first calculation unit that calculates an individual target amount of power consumption corresponding to an upper limit of an amount of power to be consumed by each of the plurality of information processing apparatuses during a plurality of second periods obtained by segmentalizing the first period, based on the first period and the overall target amount of power consumption;
   a transmission unit that transmits the corresponding second period and the individual target amount of power consumption to each of the plurality of information processing apparatuses;
   a reception unit that receives an actual usage value of the amount of power consumption in the corresponding second period transmitted from each of the plurality of information processing apparatuses in response to the corresponding second period elapsing; and
   a second calculation unit that calculates the individual target amount of power consumption, based on the actual usage value of the amount of power consumption received from each of the plurality of information processing apparatuses and the overall target amount of power consumption, the transmission unit retransmitting the individual target amount of power consumption calculated by the second calculation unit to each of the plurality of information processing apparatuses, after the actual usage value of the amount of power consumption during the corresponding second period that is transmitted from each of the plurality of information processing apparatuses has been received by the reception unit, and the information processing apparatuses each have:

a second reception unit that receives the corresponding second period and the individual target amount of power consumption transmitted from the electric power control apparatus;

a second transmission unit that transmits an actual usage value of the amount of power consumption in the corresponding second period to the electric power control apparatus, in response to the corresponding second period elapsing; and a power saving control unit that performs a prescribed power saving control, in a case where the actual usage value of the amount of power consumption in the corresponding second period exceeds the individual target amount of power consumption.

7. The electric power control system according to claim 6, wherein the second calculation unit calculates the individual target amount of power consumption, so as to increase the individual target amount of power consumption for an information processing apparatus whose actual usage value of the amount of power consumption is high.

8. The electric power control system according to claim 7, wherein the second calculation unit calculates the individual target amount of power consumption, so that the individual target amount of power consumption calculated for each of the plurality of information processing apparatuses does not fall below a prescribed lower limit value.

9. The electric power control system according to claim 6, wherein the second calculation unit calculates the individual target amount of power consumption, based on an amount of power obtained by subtracting a total amount of the actual usage values of the amount of power consumption received from the plurality of information processing apparatuses from the overall target amount of power consumption.

10. The electric power control system according to claim 6, wherein
the electric power control apparatus has a display unit that displays the individual target amount of power consumption calculated by the second calculation unit.

11. The electric power control system according to claim 6, wherein the information processing apparatuses each have a printing unit that forms an image based on image data, and
the power saving control unit performs the prescribed power saving control by changing a print layout setting.

12. The electric power control system according to claim 6, wherein the information processing apparatuses each have an enter time setting unit that sets an enter time until entering a power saving state, and
the power saving control unit performs the prescribed power saving control by shortening the enter time set by the enter time setting unit.

\* \* \* \* \*